(12) United States Patent
Watanabe

(10) Patent No.: US 7,692,701 B2
(45) Date of Patent: Apr. 6, 2010

(54) IMAGE SENSING APPARATUS

(75) Inventor: Nobuyuki Watanabe, Yokohama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/486,397

(22) Filed: Jun. 17, 2009

(65) Prior Publication Data

US 2009/0251577 A1    Oct. 8, 2009

Related U.S. Application Data

(60) Division of application No. 11/190,564, filed on Jul. 27, 2005, now Pat. No. 7,561,195, which is a continuation of application No. PCT/JP2004/000575, filed on Jan. 23, 2004.

(30) Foreign Application Priority Data

Jan. 29, 2003    (JP)    ............................. 2003-020717

(51) Int. Cl.
 *H04N 5/335* (2006.01)
 *G06K 9/00* (2006.01)
 *H01L 27/00* (2006.01)
(52) U.S. Cl. .................. 348/294; 348/298; 348/311; 348/302; 348/305; 382/167; 250/208.1
(58) Field of Classification Search ............... 348/294, 348/298, 302, 305, 311, 220.1, 303–304; 382/167; 250/208.1
See application file for complete search history.

(56) References Cited

U.S. PATENT DOCUMENTS 6,130,420 A    10/2000   Tanaka et al.
6,204,879 B1    3/2001   Koseki et al.
6,535,688 B1    3/2003   Kawamura et al.
6,992,706 B2 *  1/2006   Mabuchi et al. .......... 348/220.1

(Continued)

FOREIGN PATENT DOCUMENTS

JP    2000-308076 A    11/2000

(Continued)

OTHER PUBLICATIONS

English translation of Written Opinion of the International Searching Authority (Form PCT/ISA/237) issued in International Application No. PCT/JP2004/000575 filed Jan. 23, 2004.

*Primary Examiner*—Tuan Ho
*Assistant Examiner*—Marly Camargo
(74) *Attorney, Agent, or Firm*—Frishauf, Holtz, Goodman & Chick, P.C.

(57) ABSTRACT

An image sensing apparatus has an image sensing device. The image sensing device includes a photoelectric conversion element that photoelectrically converts an optical image to acquire image data, and a readout control unit that reads out, in accordance with a supplied readout rule, the image data acquired by the photoelectric conversion element. The image sensing device also includes an image scaling ratio selection unit that selects the scaling ratio of the image to be output, a readout scheme selection unit that selects, in accordance with the selected image scaling ratio, the readout scheme of the image data to be read out from the photoelectric conversion element by the readout control unit, and a readout rule supply unit that supplies, to the readout control unit, a readout rule corresponding to the readout scheme selected by the readout scheme selection unit.

2 Claims, 13 Drawing Sheets

U.S. PATENT DOCUMENTS

| | | |
|---|---|---|
| 7,034,869 B2 | 4/2006 | Sugimori |
| 7,170,529 B2 | 1/2007 | Chang |
| 7,242,432 B2 * | 7/2007 | Watanabe .............. 348/333.11 |
| 7,292,273 B2 | 11/2007 | Shioji |
| 7,339,616 B2 * | 3/2008 | Mabuchi et al. .......... 348/220.1 |
| 7,542,084 B2 * | 6/2009 | Watanabe ................... 348/266 |
| 2002/0135683 A1 * | 9/2002 | Tamama et al. ............. 348/222 |
| 2006/0262974 A1 * | 11/2006 | Watanabe et al. ........... 382/167 |

FOREIGN PATENT DOCUMENTS

| | | |
|---|---|---|
| JP | 2001-016441 A | 1/2001 |
| JP | 2001-245141 A | 9/2001 |
| JP | 2002-354292 | 12/2002 |
| JP | 2002-354344 A | 12/2002 |

\* cited by examiner

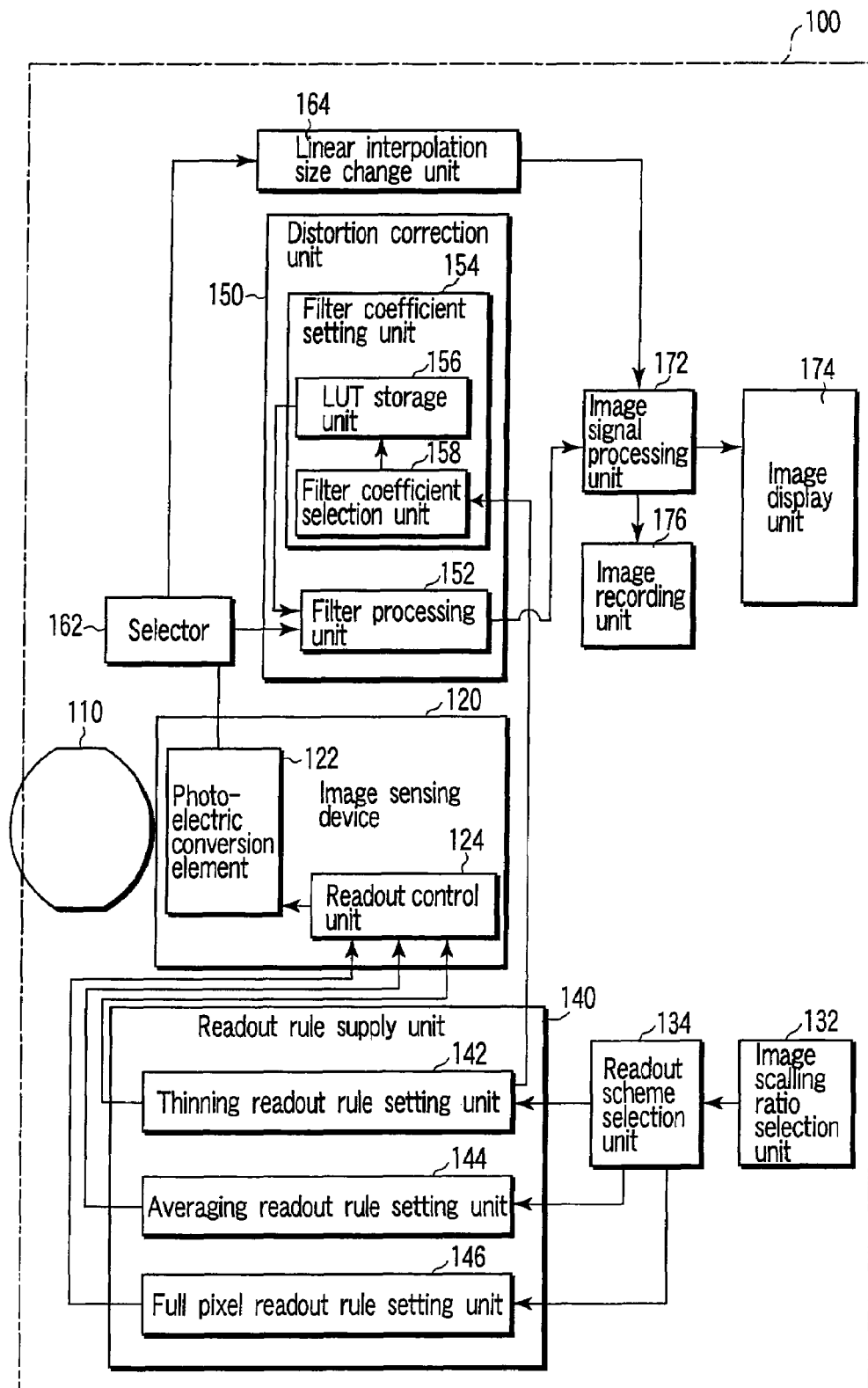
F I G. 1

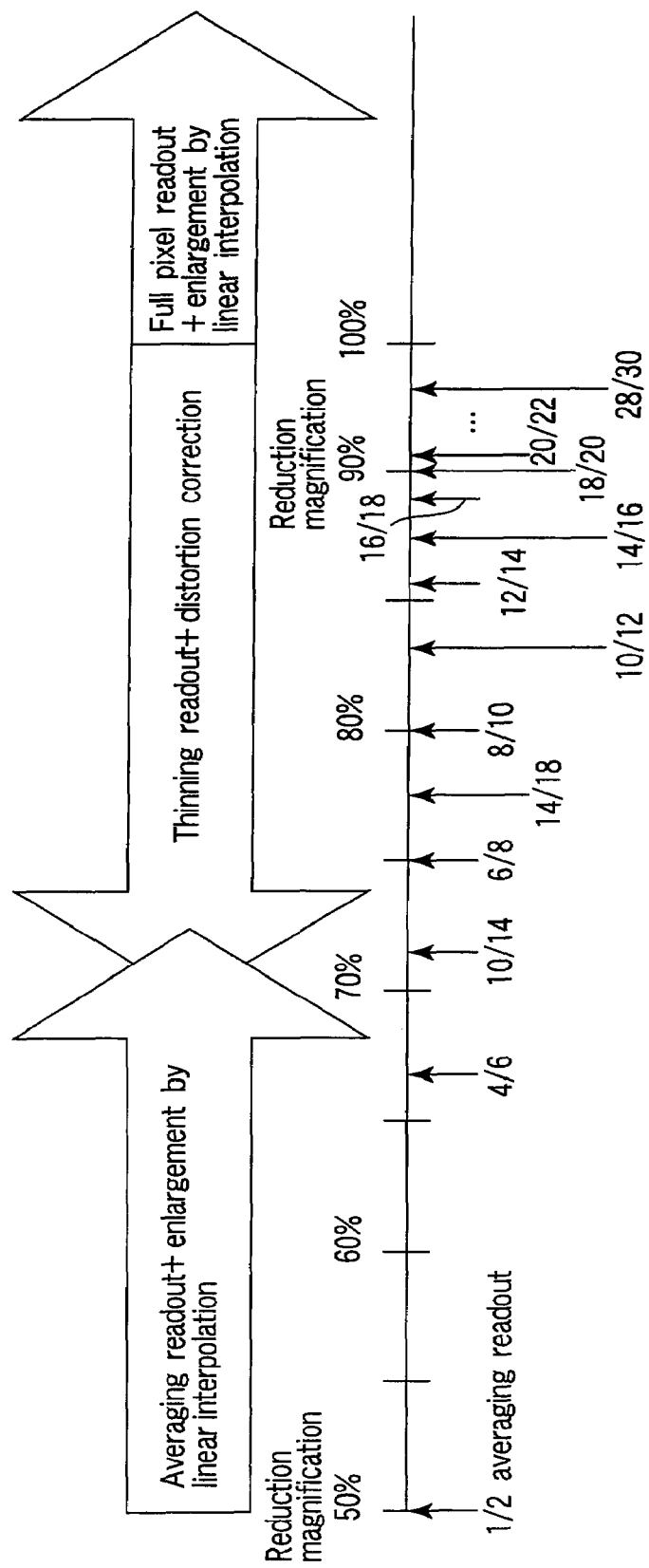
F I G. 11

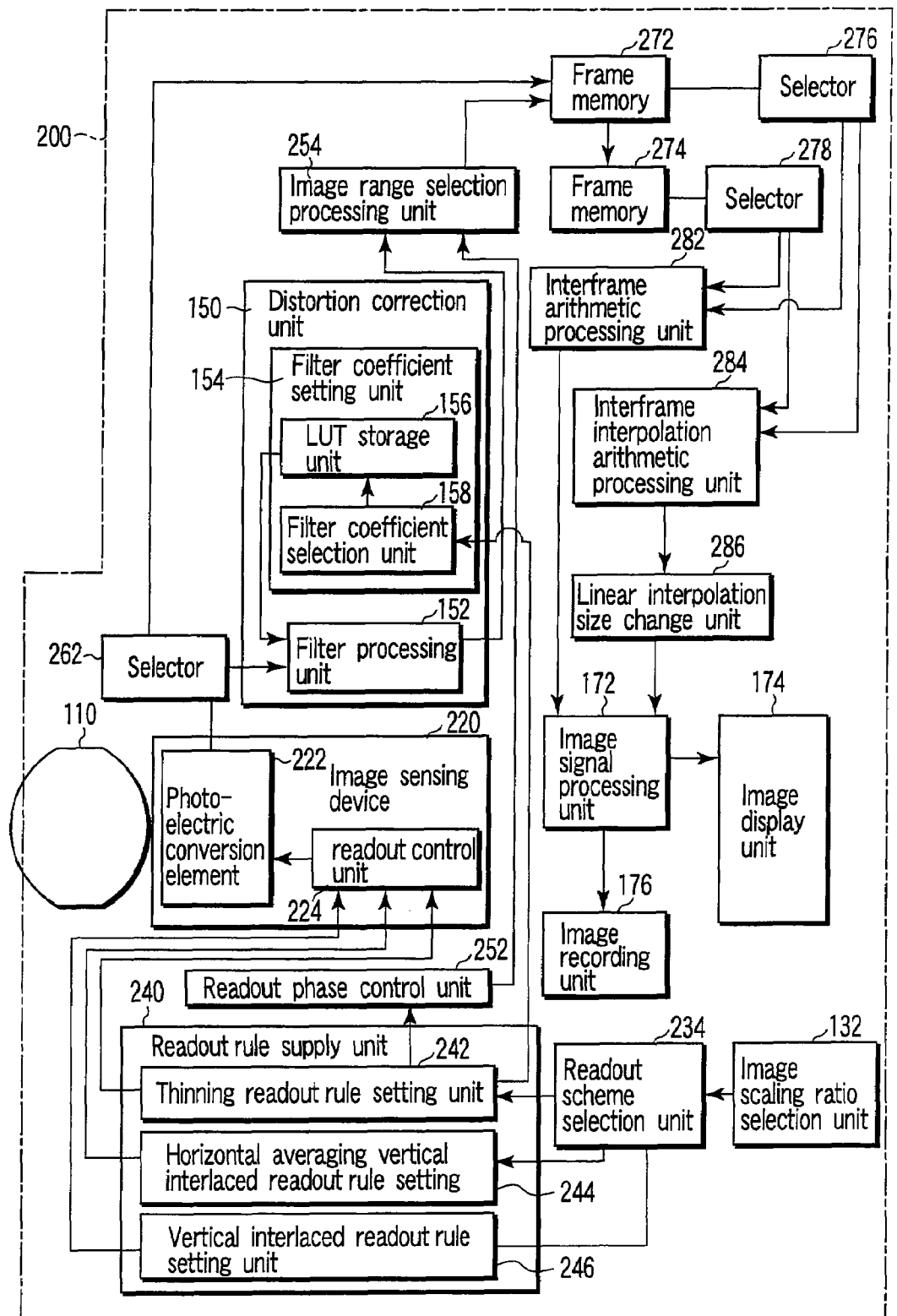
F I G. 12

IMAGE SENSING APPARATUS

CROSS-REFERENCE TO RELATED APPLICATIONS

The present application is a Divisional Application of U.S. application Ser. No. 11/190,564 filed Jul. 27, 2005 now U.S. Pat. No. 7,561,195 which is incorporated herein by reference and which is a Continuation Application of PCT Application No. PCT/JP2004/000575, filed Jan. 23, 2004, which was published under PCT Article 21(2) in Japanese.

This application is based upon and claims the benefit of priority from prior Japanese Patent Application No. 2003-020717, filed Jan. 29, 2003, the entire contents of which are incorporated herein by reference.

BACKGROUND OF THE INVENTION

1. Field of the Invention

The present invention relates to a digital image sensing apparatus and, more particularly, to a digital image sensing apparatus that quickly generates a high-quality image with a smaller number of pixels than that of an image sensing device mounted in the image sensing apparatus.

2. Description of the Related Art

Along with the recent rapid spread of personal computers, the demand for digital cameras serving as image input devices is increasing. In addition, high-quality recording apparatuses such as digital video recorders are widely used as moving image recorders.

The image quality of an electronic still camera depends on several factors. Especially, the number of pixels of an image sensing element is a very important factor for the resolution of a sensed image. Some recent commercially available electronic still cameras have more than 5 million pixels. However, data of 5 million pixels is not always necessary for all application purposes. Images displayed on the Webs of the Internet often have, if anything, smaller pixel sizes.

In current digital cameras, the transfer time from the image sensing element to the image memory is a bottleneck. Most models having a large number of pixels cannot execute high-speed continuous shooting. In addition, even digital cameras need to have a moving image sensing function as an additional function. Hence, transfer to the memory must be done at a high speed. For this purpose, the data amount to be processed is preferably reduced in advance.

When the number of pixels of an output image is smaller than that of the image sensing element, the number of pixels to be used is limited in advance. Alternatively, a plurality of pixels are averaged and read out by one clock. With this processing, the amount of data to be transferred from the image sensing element to the memory can be reduced, and the memory transfer rate can be increased.

In size reduction by linear interpolation, an image having a large size is generated by using all pixels. Then, an image with a small size is generated by linear interpolation.

Such resizing by linear interpolation can ensure a high image quality. However, since linear interpolation is executed by using all pixel data, the arithmetic amount is large. Hence, this method is inappropriate for the above-described continuous shooting function or moving image sensing.

There is a method of reducing the data amount of memory readout, in which an integration function is added to the image sensing element so that a reduced image is generated by reading out a small number of averaged data. Jpn. Pat. Appln. KOKAI Publication No. 2001-245141 discloses a high-speed image reducing method using this method.

Jpn. Pat. Appln. KOKAI Publication No. 2001-016441 discloses an apparatus that executes data thinning and also corrects distortion of data when the number of resolutions is limited. An embodiment of this reference discloses creation of 400-dpi data by an apparatus having a resolution of 600 dpi. When 600-dpi data is directly thinned out, the data is distorted. To cope with this, pixel data to compensate for the distortion of positions is generated from the 600-dpi data by linear interpolation. The apparatus disclosed in Jpn. Pat. Appln. KOKAI Publication No. 2001-016441 creates 400-dpi data by executing interpolation totally using all 600-dpi data obtained by scanning.

BRIEF SUMMARY OF THE INVENTION

The present invention is directed to an image sensing apparatus that shortens the time required to read out image data from an image sensing element and can form a high-resolution image with few distortion in a wide scaling ratio range.

An image sensing apparatus according to the present invention has an image sensing device. The image sensing device includes a photoelectric conversion element that photoelectrically converts an optical image to acquire image data, and a readout control unit that reads out, in accordance with a supplied readout rule, the image data acquired by the photoelectric conversion element. The image sensing device also includes an image scaling ratio selection unit that selects the scaling ratio of the image to be output, a readout scheme selection unit that selects, in accordance with the selected image scaling ratio, the readout scheme of the image data to be read out from the photoelectric conversion element by the readout control unit, and a readout rule supply unit that supplies, to the readout control unit, a readout rule corresponding to the readout scheme selected by the readout scheme selection unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows the arrangement of an image sensing apparatus according to the first embodiment of the present invention.

FIG. 4 shows an example in which two of 16 pixels are thinned out in both the horizontal and vertical directions.

FIG. 6 shows an example in which two of eight pixels are thinned out in both the horizontal and vertical directions.

FIG. 11 shows readout scheme switching and size change corresponding to an image scaling ratio in the image sensing apparatus shown in FIG. 1.

FIG. 12 shows the arrangement of an image sensing apparatus according to the second embodiment of the present invention.

FIG. 14 schematically shows pixel data in the same area of two frames that are adjacent time-serially, the pixel data being read out by thinning readout and readout area reference position shift processing.

FIG. 15 shows pixel position of frame readout in a readout by repeating 6/8 thinning readout, in which the readout start position of the readout area matches the upper left pixel of the pixel matrix of a photoelectric conversion element.

FIG. 16 shows pixel position of frame readout in a readout by repeating 6/8 thinning readout, in which the readout end position of the readout area matches the lower right pixel of the pixel matrix of the photoelectric conversion element.

DETAILED DESCRIPTION OF THE INVENTION

Figure 2:
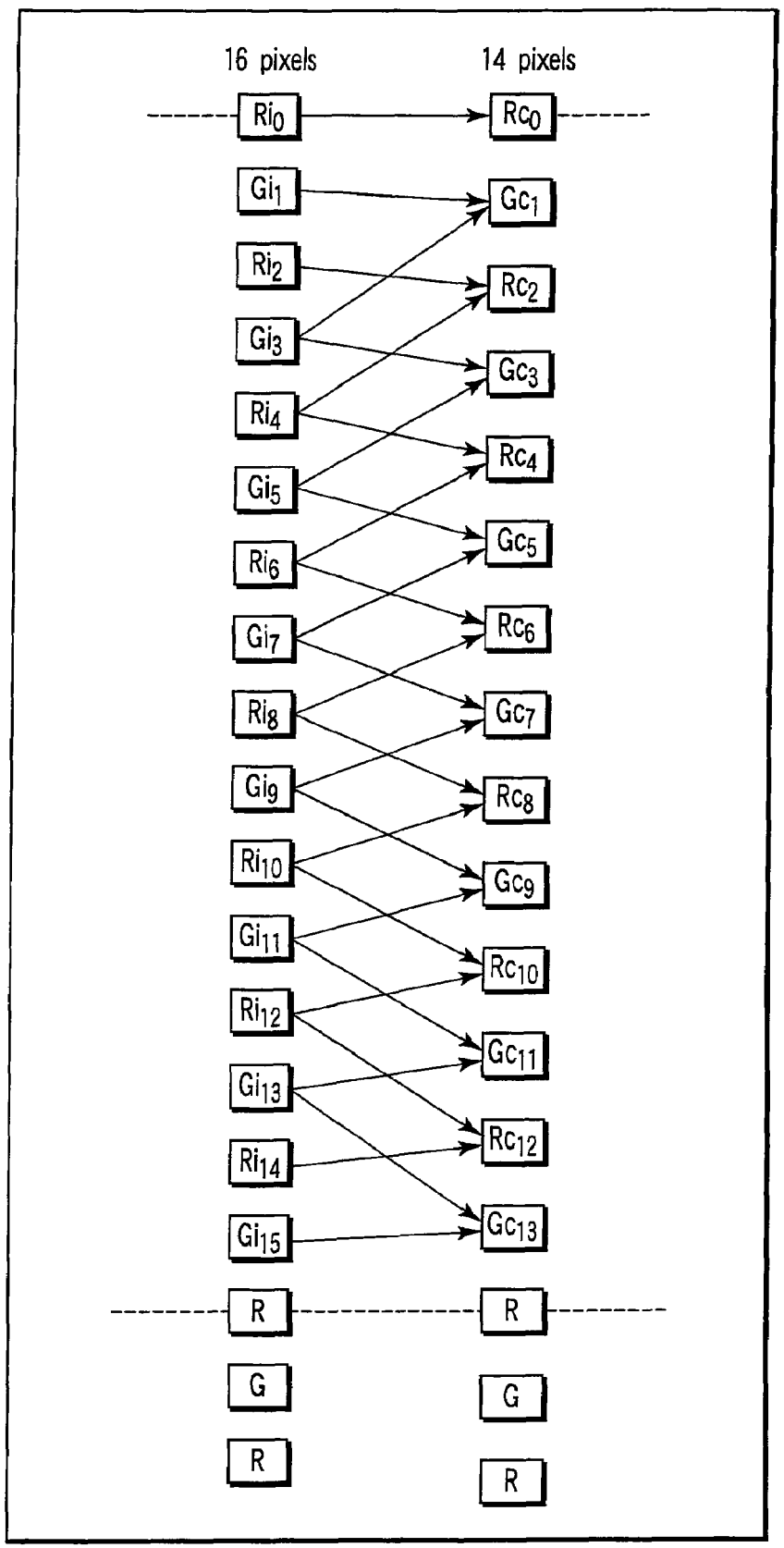
FIG. 2 shows an example in which an image having an RG/GB Bayer matrix is subjected to 14/16 reduction conversion in the vertical direction.

The embodiments of the present invention will be described below with reference to the accompanying drawings.

First Embodiment

FIG. 1 shows the arrangement of an image sensing apparatus according to the first embodiment of the present invention. An image sensing apparatus 100 has an imaging optical system 110 that forms an optical image of an object and an image sensing device 120 that outputs an image signal in a predetermined region of the optical image formed by the imaging optical system 110. The image sensing device 120 has a two-dimensional photoelectric conversion element (image sensing element) 122 that photoelectrically converts the optical image formed by the imaging optical system 110 to acquire image data (pixel data set) and a readout control unit 124 that reads out the image data acquired by the photoelectric conversion element 122 in accordance with a supplied readout rule.

The image sensing apparatus 100 also has an image scaling ratio selection unit 132 that selects the scaling ratio of the image to be output, a readout scheme selection unit 134 that selects the readout scheme of the image data to be read out from the photoelectric conversion element 122 by the readout control unit 124 in accordance with the selected image scaling ratio, and a readout rule supply unit 140 that supplies a readout rule corresponding to the readout scheme selected by the readout scheme selection unit 134 to the image sensing device 120.

The readout scheme selection unit 134 selects one readout scheme of a thinning readout mode, an averaging readout mode, and a full-pixel readout mode in accordance with the selected image scaling ratio. The readout rule supply unit 140 includes a thinning readout rule setting unit 142 that sets a readout rule corresponding to the thinning readout mode, averaging readout rule setting unit 144 that sets a readout rule corresponding to the averaging readout mode, and full-pixel readout rule setting unit 146 that sets a readout rule corresponding to the full-pixel readout mode.

The readout rule supply unit 140 selectively operates one of the thinning readout rule setting unit 142, averaging readout rule setting unit 144, and full-pixel readout rule setting unit 146, which corresponds to the readout scheme selected by the readout scheme selection unit 134. Then, a readout rule corresponding to the readout scheme selected by the readout scheme selection unit 134 is supplied to the readout control unit 124; the readout control unit 124 reads out pixel data from the photoelectric conversion element 122 in accordance with the readout rule supplied from the readout rule supply unit 140.

More specifically, for an image scaling ratio lower than 100%, i.e., for image reduction, the readout scheme selection unit 134 selects one of the thinning readout mode and averaging readout mode. For an image scaling ratio of 100% or more, i.e., for image enlargement, the readout scheme selection unit 134 selects the full-pixel readout mode. The image scaling ratio indicates the ratio of the size (the number of pixels in the horizontal and vertical area) of two-dimensionally arrayed pixel data of an image to be output (e.g., displayed on an image display unit 174) to the region (the number of pixels in the horizontal and vertical area) of two-dimensionally arrayed pixel data acquired by the photoelectric conversion element 122.

For an image scaling ratio lower than 100%, the readout scheme selection unit 134 selects one of the thinning readout mode and averaging readout mode on the basis of the image scaling ratio and an important one of factors (contrast, resolution, distortion, luminance moiré, and color moiré) of the quality of the image to be output. In other words, for an image scaling ratio lower than 100%, the readout scheme selection unit 134 selects one of the thinning readout mode and averaging readout mode on the basis of the image scaling ratio and assumed object.

The image sensing apparatus 100 also has a distortion correction unit 150 that executes distortion correction for the image signal output from the image sensing device 120 in the thinning readout mode, a linear interpolation size change unit 164 that executes size change by linear interpolation for the image signal output from the image sensing device 120 in the averaging readout mode and full-pixel readout mode, and a selector 162 that selectively sends the image signal output from the image sensing device 120 to one of the distortion correction unit 150 and linear interpolation size change unit 164 in accordance with the readout scheme selected by the readout scheme selection unit 134.

When the readout scheme selection unit 134 selects the thinning readout mode, the selector 162 sends the image signal from the image sensing device 120 to the distortion correction unit 150. When the readout scheme selection unit 134 selects the averaging readout mode or full-pixel readout mode, the selector 162 sends the image signal from the image sensing device 120 to the linear interpolation size change unit 164.

The distortion correction unit 150 has a filter processing unit 152 that executes filter processing for the image signal from the image sensing device 120 and a filter coefficient setting unit 154 that sets a filter coefficient to be used for the filter processing by the filter processing unit 152 in accordance with the readout rule set by the thinning readout rule setting unit 142.

The filter coefficient setting unit 154 has an LUT storage unit 156 that stores a lookup table (LUT) containing a plurality of filter coefficients and a filter coefficient selection unit 158 that selects a filter coefficient from the lookup table stored in the LUT storage unit 156.

The filter coefficient setting unit 154 need not always have the LUT storage unit 156 and filter coefficient selection unit 158. The filter coefficient setting unit 154 may calculates a filter coefficient by arithmetic processing corresponding to the readout rule set by the thinning readout rule setting unit 142.

The filter coefficient setting unit 154 that uses an LUT requires a large memory capacity to store the LUT, though the load of arithmetic processing can be small. On the other hand, the filter coefficient setting unit 154 that uses no LUT requires no large memory capacity, though the load of arithmetic processing is large.

The image sensing apparatus 100 also has an image signal processing unit 172 that executes predetermined processing (e.g., white balance, gray level conversion, or edge enhancement) for the image signal output from the distortion correction unit 150 in the thinning readout mode or the image signal output from the linear interpolation size change unit 164 in the averaging readout mode or full-pixel readout mode, an image display unit 174 that displays an image in accordance with the image signal output from the image signal processing unit 172, and an image recording unit 176 that records an image in accordance with the image signal output from the image signal processing unit 172.

The image sensing device 120 can execute a thinning readout operation. By the thinning readout operation, the image sensing device 120 can read out pixels in a specific region on the photoelectric conversion element 122 in a shorter time than the readout of all pixels.

For example, when the photoelectric conversion element 122 is an image sensing element using CMOS, the image sensing device 120 can designate a readout position by using shift registers in both the horizontal and vertical directions.

More specifically, assuming that the ith element of the jth line is defined as $C(i, j)$ and pixels from there in the horizontal direction are defined as $C(i+1, j)$, $C(i+2, j)$, $C(i+3, j)$, $C(i+4, j)$, $C(i+5, j)$, $C(i+6, j)$, $C(i+7, j)$, $C(i+8, j)$, . . . , it can read out pixels thinning out them at arbitrary horizontal positions, like $C(i+1, j)$, $C(i+2, j)$, $C(i+3, j)$, $C(i+4, j)$, $C(i+7, j)$, $C(i+8, j)$, . . . , for example.

This also applies to the vertical direction; for pixels arrayed in the direction of lines, e.g., jth line, (j+1)th line, (j+2)th line . . . , it can read out pixels thinning out them at arbitrary lines.

When the photoelectric conversion element 122 is a CCD, since it reads out data while shifting charges in the horizontal direction, the image sensing device 120 reads out all pixels in the horizontal direction but can read out pixels thinning out them in the vertical direction.

The distortion correction unit 150 interpolates the thinned digital image data with omitted information and also executes filter processing for magnification conversion. That is, in this specification, distortion correction means simultaneously executing "interpolation" and "magnification conversion".

In bilinear interpolation, when the magnification conversion is limited to a rational number (integral ratio), and linear interpolation is repeated twice, the algorithm is simplified. FIG. 2 shows an example in which an image having an RG/GB Bayer matrix is subjected to 14/16 reduction conversion in the horizontal direction. Referring to FIG. 2, the upper stage indicates a one-dimensional data array of pixels before reduction conversion, and the lower stage indicates a one-dimensional data array of pixels after reduction conversion.

This conversion can be expressed by a matrix given by $$\begin{pmatrix} Rc_0 \\ Gc_1 \\ Rc_2 \\ Gc_3 \\ Rc_4 \\ Gc_5 \\ Rc_6 \\ Gc_7 \\ Rc_8 \\ Gc_9 \\ Rc_{10} \\ Gc_{11} \\ Rc_{12} \\ Gc_{13} \end{pmatrix} = \begin{pmatrix} 1 & 0 & 0 & 0 & 0 & 0 & 0 & 0 & 0 & 0 & 0 & 0 & 0 & 0 & 0 & 0 \\ 0 & \frac{13}{14} & 0 & \frac{1}{14} & 0 & 0 & 0 & 0 & 0 & 0 & 0 & 0 & 0 & 0 & 0 & 0 \\ 0 & 0 & \frac{12}{14} & 0 & \frac{2}{14} & 0 & 0 & 0 & 0 & 0 & 0 & 0 & 0 & 0 & 0 & 0 \\ 0 & 0 & 0 & \frac{11}{14} & 0 & \frac{3}{14} & 0 & 0 & 0 & 0 & 0 & 0 & 0 & 0 & 0 & 0 \\ 0 & 0 & 0 & 0 & \frac{10}{14} & 0 & \frac{4}{14} & 0 & 0 & 0 & 0 & 0 & 0 & 0 & 0 & 0 \\ 0 & 0 & 0 & 0 & 0 & \frac{9}{14} & 0 & \frac{5}{14} & 0 & 0 & 0 & 0 & 0 & 0 & 0 & 0 \\ 0 & 0 & 0 & 0 & 0 & 0 & \frac{8}{14} & 0 & \frac{6}{14} & 0 & 0 & 0 & 0 & 0 & 0 & 0 \\ 0 & 0 & 0 & 0 & 0 & 0 & 0 & \frac{7}{14} & 0 & \frac{7}{14} & 0 & 0 & 0 & 0 & 0 & 0 \\ 0 & 0 & 0 & 0 & 0 & 0 & 0 & 0 & \frac{6}{14} & 0 & \frac{8}{14} & 0 & 0 & 0 & 0 & 0 \\ 0 & 0 & 0 & 0 & 0 & 0 & 0 & 0 & 0 & \frac{5}{14} & 0 & \frac{9}{14} & 0 & 0 & 0 & 0 \\ 0 & 0 & 0 & 0 & 0 & 0 & 0 & 0 & 0 & 0 & \frac{4}{14} & 0 & \frac{10}{14} & 0 & 0 & 0 \\ 0 & 0 & 0 & 0 & 0 & 0 & 0 & 0 & 0 & 0 & 0 & \frac{3}{14} & 0 & \frac{11}{14} & 0 & 0 \\ 0 & 0 & 0 & 0 & 0 & 0 & 0 & 0 & 0 & 0 & 0 & 0 & \frac{2}{14} & 0 & \frac{12}{14} & 0 \\ 0 & 0 & 0 & 0 & 0 & 0 & 0 & 0 & 0 & 0 & 0 & 0 & 0 & \frac{1}{14} & 0 & \frac{13}{14} \end{pmatrix} \begin{pmatrix} Ri_0 \\ Gi_1 \\ Ri_2 \\ Gi_3 \\ Ri_4 \\ Gi_5 \\ Ri_6 \\ Gi_7 \\ Ri_8 \\ Gi_9 \\ Ri_{10} \\ Gi_{11} \\ Ri_{12} \\ Gi_{13} \\ Ri_{14} \\ Gi_{15} \end{pmatrix} \quad (1)$$

In Equation (1), $Ri_{2p}$ and $Gi_{2p+1}$ (p is an integer that is no smaller than 0 and smaller than 7) represent pixel data of pixels continuously arrayed in the horizontal direction in the photoelectric conversion element 122 and have consecutive subscripts corresponding to the positions of the pixels arrayed in the horizontal direction. $Rc_{2q}$ and $Gc_{2q+1}$ (q is an integer that is no smaller than 0 and smaller than 6) represent pixel data after conversion and have consecutive subscripts corresponding to the positions of the pixels arrayed in the horizontal direction.

For example, using $Ri_2$ and $Ri_4$, $Rc_2$ after conversion is given by $$Rc_2 = \frac{12}{14} Ri_2 + \frac{2}{14} Ri_4. \tag{2}$$

Equation (1) generally expresses the conversion from 16 pixels to 14 pixels, in which each pixel is converted in the above-described manner.

Figure 3:
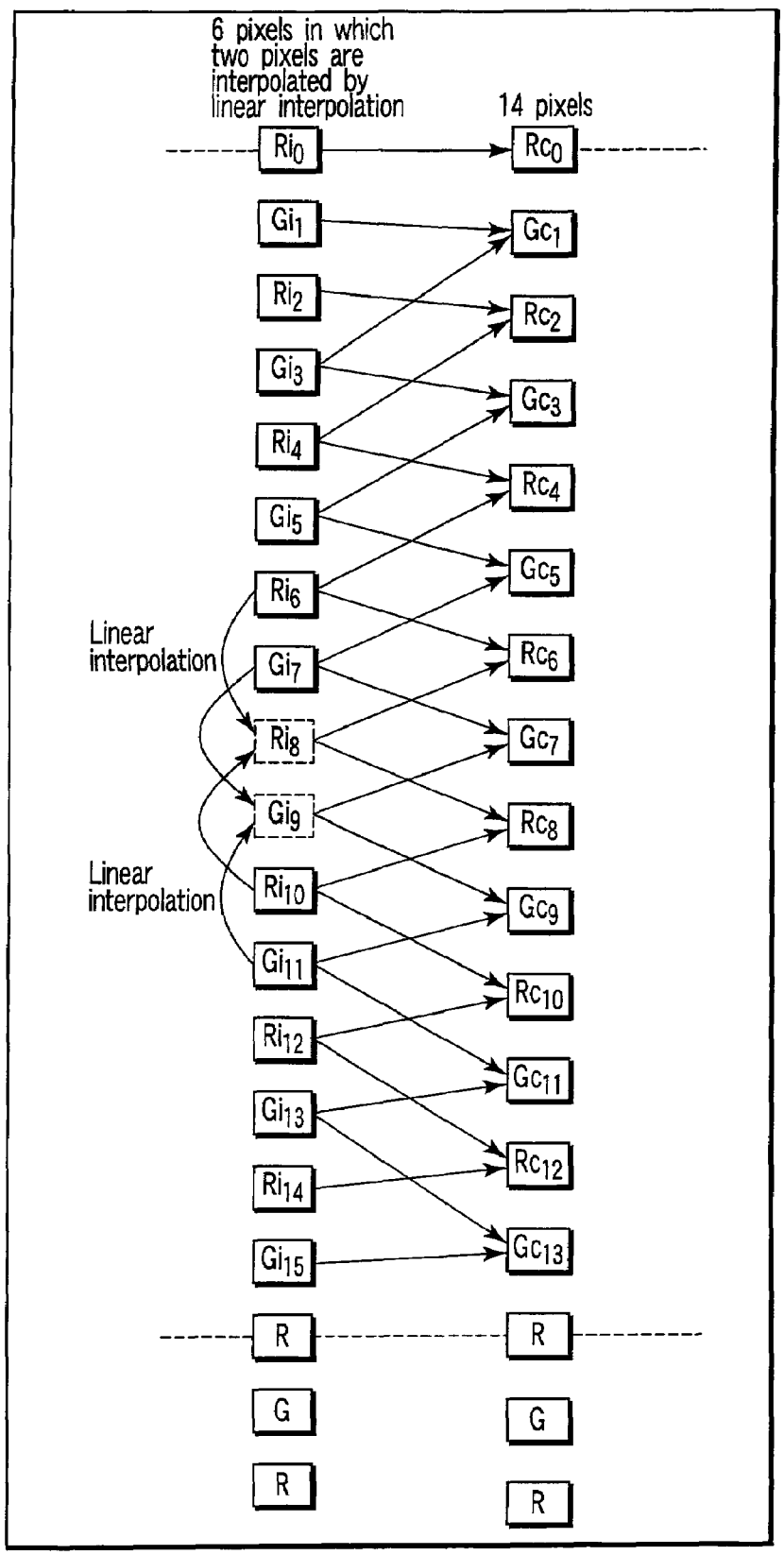
FIG. 3 shows a state in which, of 16 pixels before conversion, the eighth and ninth pixel data from the upper side are omitted in the conversion shown in FIG. 2.

FIG. 3 shows a state in which, of the 16 pixels before conversion, the eighth and ninth pixel data from the left side are omitted in the conversion shown in FIG. 2. In this case, omitted pixel data $Ri_8$ and $Gi_9$ are preferably linearly interpolated by using close pixel data ($Ri_6$ and $Ri_{10}$ for $Ri_8$ and $Gi_7$ and $Gi_{11}$ for $Gi_9$) of the same channel in accordance with $$Ri_8 = \frac{Ri_6 + Ri_{10}}{2}, \tag{3}$$

$$Gi_9 = \frac{Gi_7 + Gi_{11}}{2}.$$

When $Ri_8$ and $Gi_9$ in Equation (1) are replaced in accordance with Equation (3), we obtain $$\begin{pmatrix} Rc_0 \\ Gc_1 \\ Rc_2 \\ Gc_3 \\ Rc_4 \\ Gc_5 \\ Rc_6 \\ Gc_7 \\ Rc_8 \\ Gc_9 \\ Rc_{10} \\ Gc_{11} \\ Rc_{12} \\ Gc_{13} \end{pmatrix} = \begin{pmatrix} 1 & 0 & 0 & 0 & 0 & 0 & 0 & 0 & 0 & 0 & 0 & 0 & 0 & 0 & 0 & 0 \\ 0 & \frac{13}{14} & 0 & \frac{1}{14} & 0 & 0 & 0 & 0 & 0 & 0 & 0 & 0 & 0 & 0 & 0 & 0 \\ 0 & 0 & \frac{12}{14} & 0 & \frac{2}{14} & 0 & 0 & 0 & 0 & 0 & 0 & 0 & 0 & 0 & 0 & 0 \\ 0 & 0 & 0 & \frac{11}{14} & 0 & \frac{3}{14} & 0 & 0 & 0 & 0 & 0 & 0 & 0 & 0 & 0 & 0 \\ 0 & 0 & 0 & 0 & \frac{10}{14} & 0 & \frac{4}{14} & 0 & 0 & 0 & 0 & 0 & 0 & 0 & 0 & 0 \\ 0 & 0 & 0 & 0 & 0 & \frac{9}{14} & 0 & \frac{5}{14} & 0 & 0 & 0 & 0 & 0 & 0 & 0 & 0 \\ 0 & 0 & 0 & 0 & 0 & 0 & \frac{8}{14} & 0 & \frac{6}{14} & 0 & 0 & 0 & 0 & 0 & 0 & 0 \\ 0 & 0 & 0 & 0 & 0 & 0 & 0 & \frac{7}{14} & 0 & \frac{7}{14} & 0 & 0 & 0 & 0 & 0 & 0 \\ 0 & 0 & 0 & 0 & 0 & 0 & 0 & 0 & \frac{6}{14} & 0 & \frac{8}{14} & 0 & 0 & 0 & 0 & 0 \\ 0 & 0 & 0 & 0 & 0 & 0 & 0 & 0 & 0 & \frac{5}{14} & 0 & \frac{9}{14} & 0 & 0 & 0 & 0 \\ 0 & 0 & 0 & 0 & 0 & 0 & 0 & 0 & 0 & 0 & \frac{4}{14} & 0 & \frac{10}{14} & 0 & 0 & 0 \\ 0 & 0 & 0 & 0 & 0 & 0 & 0 & 0 & 0 & 0 & 0 & \frac{3}{14} & 0 & \frac{11}{14} & 0 & 0 \\ 0 & 0 & 0 & 0 & 0 & 0 & 0 & 0 & 0 & 0 & 0 & 0 & \frac{2}{14} & 0 & \frac{12}{14} & 0 \\ 0 & 0 & 0 & 0 & 0 & 0 & 0 & 0 & 0 & 0 & 0 & 0 & 0 & \frac{1}{14} & 0 & \frac{13}{14} \end{pmatrix} \begin{pmatrix} Ri_0 \\ Gi_1 \\ Ri_2 \\ Gi_3 \\ Ri_4 \\ Gi_5 \\ Ri_6 \\ Gi_7 \\ \frac{Ri_6 + Ri_{10}}{2} \\ \frac{Gi_7 + Gi_{11}}{2} \\ Ri_{10} \\ Gi_{11} \\ Ri_{12} \\ Gi_{13} \\ Ri_{14} \\ Gi_{15} \end{pmatrix}. \tag{4}$$

Sixteen data arrays $Ri_0, Gi_1, \ldots, Ri_{14}$, and $Gi_{15}$ on the right-hand side of Equation (4) can be expressed by $$\begin{pmatrix} Ri_0 \\ Gi_1 \\ Ri_2 \\ Gi_3 \\ Ri_4 \\ Gi_5 \\ Ri_6 \\ Gi_7 \\ \frac{Ri_6 + Ri_{10}}{2} \\ \frac{Gi_7 + Gi_{11}}{2} \\ Ri_{10} \\ Gi_{11} \\ Ri_{12} \\ Gi_{13} \\ Ri_{14} \\ Gi_{15} \end{pmatrix} = \begin{pmatrix} 1 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 \\ 0 & 0 & 0 & 0 & 0 & 0 & 0 & 1 & 0 & 0 & 0 & 0 & 0 & 0 \\ 0 & 0 & 0 & 0 & 0 & 0 & \frac{1}{2} & 0 & \frac{1}{2} & 0 & 0 & 0 & 0 & 0 \\ 0 & 0 & 0 & 0 & 0 & 0 & 0 & \frac{1}{2} & 0 & \frac{1}{2} & 0 & 0 & 0 & 0 \\ 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 1 \end{pmatrix} \begin{pmatrix} Ri_0 \\ Gi_1 \\ Ri_2 \\ Gi_3 \\ Ri_4 \\ Gi_5 \\ Ri_6 \\ Gi_7 \\ Ri_{10} \\ Gi_{11} \\ Ri_{12} \\ Gi_{13} \\ Ri_{14} \\ Gi_{15} \end{pmatrix} \quad (5)$$

When this is substituted into Equation (4), and the product of the matrix is calculated, we obtain $$\begin{pmatrix} Rc_0 \\ Gc_1 \\ Rc_2 \\ Gc_3 \\ Rc_4 \\ Gc_5 \\ Rc_6 \\ Gc_7 \\ Rc_8 \\ Gc_9 \\ Rc_{10} \\ Gc_{11} \\ Rc_{12} \\ Gc_{13} \end{pmatrix} = \begin{pmatrix} 1 & 0 & 0 & 0 & 0 & 0 & 0 & 0 & 0 & 0 & 0 & 0 & 0 & 0 \\ 0 & \frac{13}{14} & 0 & \frac{1}{14} & 0 & 0 & 0 & 0 & 0 & 0 & 0 & 0 & 0 & 0 \\ 0 & 0 & \frac{12}{14} & 0 & \frac{2}{14} & 0 & 0 & 0 & 0 & 0 & 0 & 0 & 0 & 0 \\ 0 & 0 & 0 & \frac{11}{14} & 0 & \frac{3}{14} & 0 & 0 & 0 & 0 & 0 & 0 & 0 & 0 \\ 0 & 0 & 0 & 0 & \frac{10}{14} & 0 & \frac{4}{14} & 0 & 0 & 0 & 0 & 0 & 0 & 0 \\ 0 & 0 & 0 & 0 & 0 & \frac{9}{14} & 0 & \frac{5}{14} & 0 & 0 & 0 & 0 & 0 & 0 \\ 0 & 0 & 0 & 0 & 0 & \frac{11}{14} & 0 & \frac{3}{14} & 0 & 0 & 0 & 0 & 0 & 0 \\ 0 & 0 & 0 & 0 & 0 & 0 & \frac{21}{28} & 0 & \frac{7}{28} & 0 & 0 & 0 & 0 & 0 \\ 0 & 0 & 0 & 0 & 0 & 0 & \frac{3}{14} & 0 & \frac{11}{14} & 0 & 0 & 0 & 0 & 0 \\ 0 & 0 & 0 & 0 & 0 & 0 & 0 & \frac{5}{28} & 0 & \frac{23}{28} & 0 & 0 & 0 & 0 \\ 0 & 0 & 0 & 0 & 0 & 0 & 0 & \frac{4}{14} & 0 & \frac{10}{14} & 0 & 0 & 0 & 0 \\ 0 & 0 & 0 & 0 & 0 & 0 & 0 & 0 & \frac{3}{14} & 0 & \frac{11}{14} & 0 & 0 & 0 \\ 0 & 0 & 0 & 0 & 0 & 0 & 0 & 0 & \frac{2}{14} & 0 & \frac{12}{14} & 0 & 0 & 0 \\ 0 & 0 & 0 & 0 & 0 & 0 & 0 & 0 & 0 & \frac{1}{14} & 0 & \frac{13}{14} & 0 & 0 \end{pmatrix} \begin{pmatrix} Ri_0 \\ Gi_1 \\ Ri_2 \\ Gi_3 \\ Ri_4 \\ Gi_5 \\ Ri_6 \\ Gi_7 \\ Ri_{10} \\ Gi_{11} \\ Ri_{12} \\ Gi_{13} \\ Ri_{14} \\ Gi_{15} \end{pmatrix} \quad (6)$$

This conversion is equivalent to Equation (4) and has 14 pixel data outputs corresponding to 14 pixel data inputs. In other words, this conversion obtains 14 pixel data after 14/16 reduction conversion from the 14 pixel data except the pixel data $Ri_8$ and $Gi_9$.

Figures 4, 6:
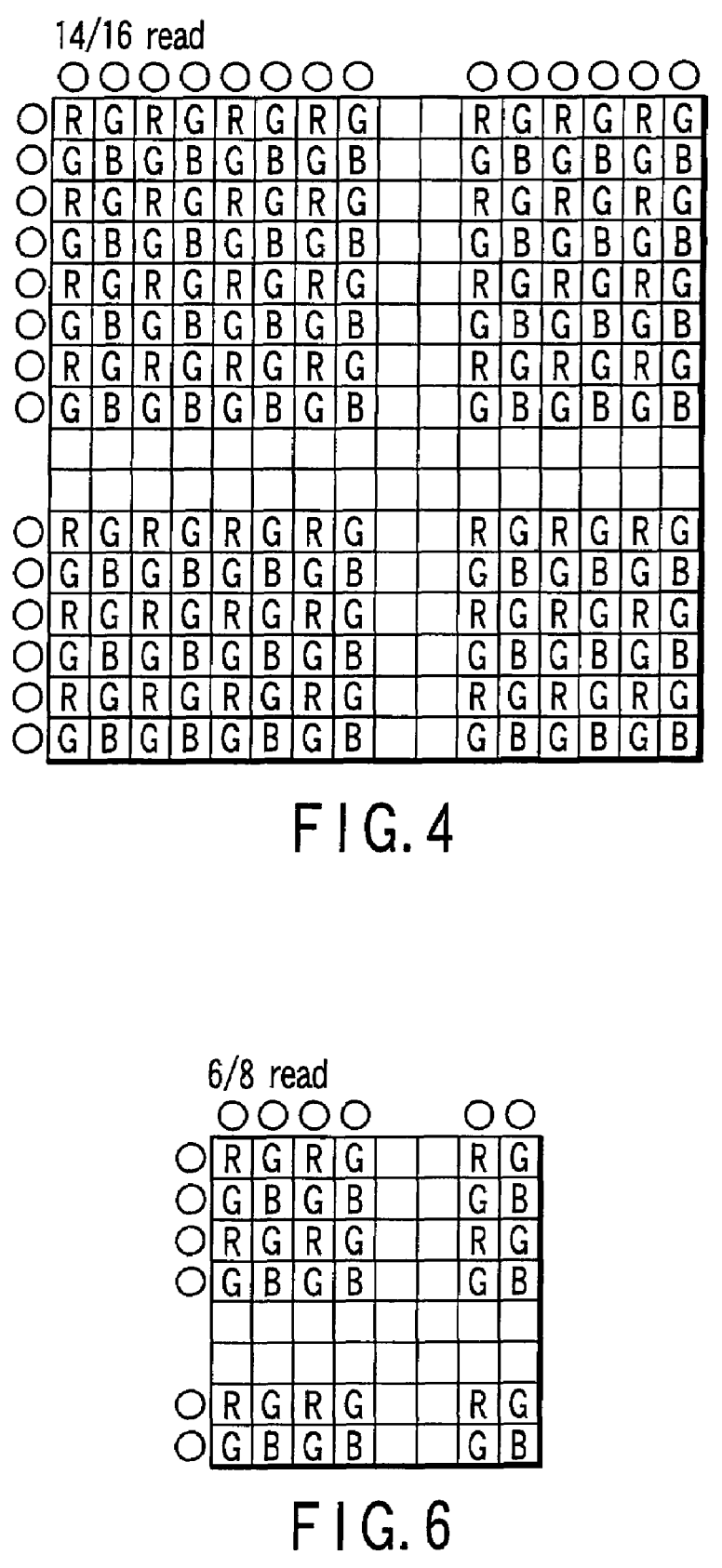

FIG. 4 shows an example in which two of 16 pixels are thinned out in both the horizontal and vertical directions. In this example, the eighth and ninth pixels are thinned out in both the horizontal and vertical directions.

Figure 5:
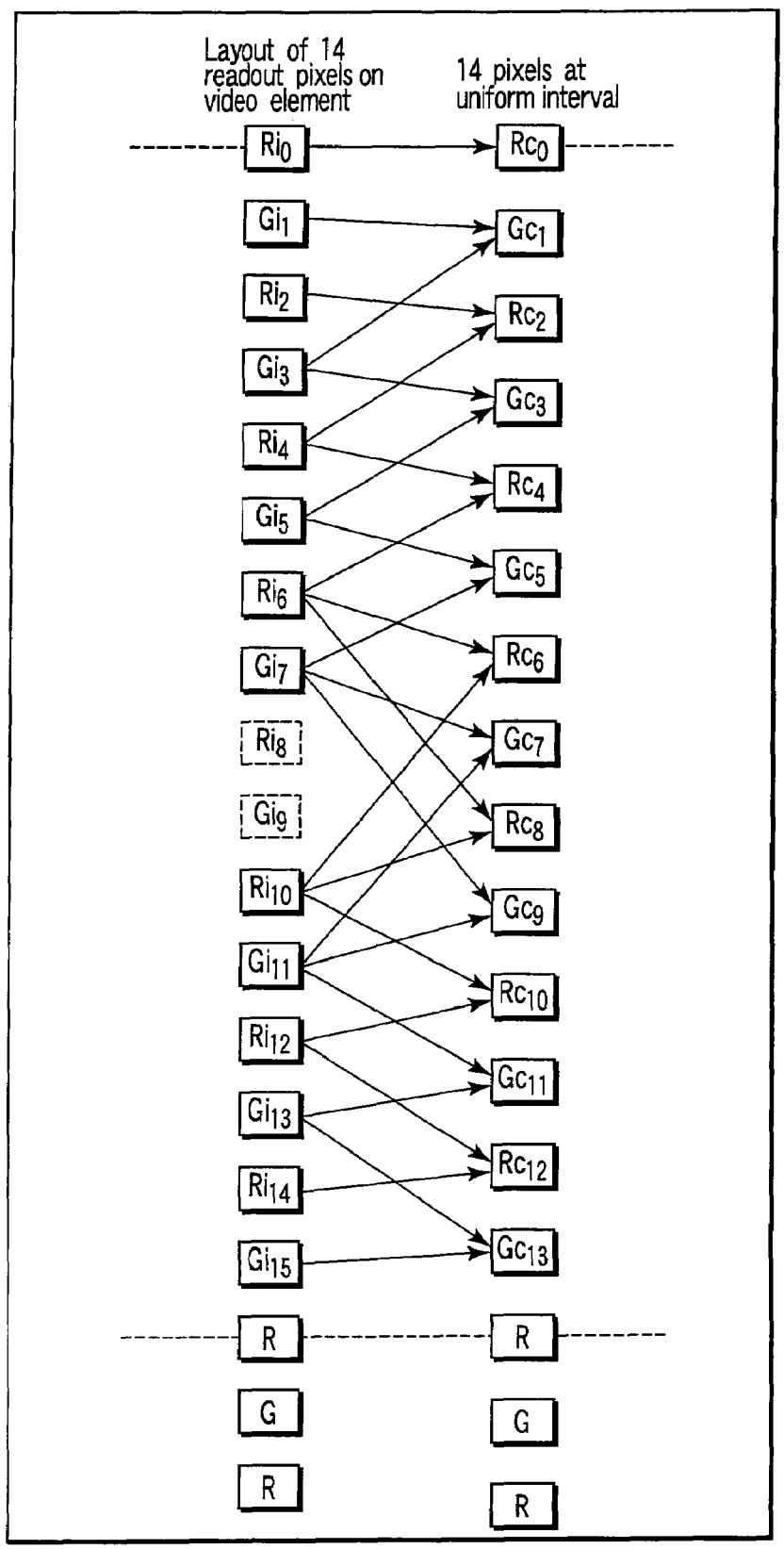
FIG. 5 shows distortion correction conversion of the data of the first column on the left side of the pixel data that is thinned out according to the example shown in FIG. 4.

FIG. 5 shows conversion of the first column on the left side of the pixel data that is read out with thinning-out according to the example shown in FIG. 4. As shown in FIG. 5, actually readout pixel data are 14 data, $Ri_0, Gi_1, Ri_2, Gi_3, Ri_4, Gi_5, Ri_6, Gi_7, Ri_{10}, Gi_{11}, Ri_{12}, Gi_{13}, Ri_{14}$, and $Gi_{15}$, in the vertical direction.

Equation (6) is equivalent to conversion that obtains 14 pixel data after 14/16 reduction conversion from the 14 pixel data except the thinned eighth (eighth row) and ninth (ninth row) pixel data.

As is apparent from the equation of linear operation by the matrix expression of Equation (6), since pixel thinning is executed, pixel data $Rc_6$ and $Rc_8$ at different positions after distortion correction are represented by the weighted linear sums of the original pixel data $Ri_6$ and $Ri_{10}$, which are given by $$Rc_6 = \frac{11}{14} Ri_6 + \frac{3}{14} Ri_{10} \quad (7)$$

$$Rc_8 = \frac{3}{14} Ri_6 + \frac{11}{14} Ri_{10}.$$

The pixel data used to obtain the pixel data $Rc_8$ is the same as the pixel data used to obtain the pixel data $Rc_6$. More specifically, the order of the pixel data used to obtain the pixel data $Rc_8$ is different from that of the pixel data used to obtain the pixel data $Rc_1$ to $Rc_6$ before that (i.e., the phase is shifted). This also applies to the pixel data $Gc_7$ and $Gc_9$.

As shown in FIG. 5, pixel data that is actually read out comprises 14 data of $Ri_0$, $Gi_1$, $Ri_2$, $Gi_3$, $Ri_4$, $Gi_5$, $Ri_6$, $Gi_7$, $Ri_{10}$, $Gi_{11}$, $Ri_{12}$, $Gi_{13}$, $Ri_{14}$, and $Gi_{15}$. Assume that these are $Rj_0$, $Gj_1$, $Rj_2$, $Gj_3$, $Rj_4$, $Gj_5$, $Rj_6$, $Gj_7$, $Rj_8$, $Gj_9$, $Rj_{10}$, $Gj_{11}$, $Rj_{12}$, and $Gj_{13}$, respectively. That is, $$\begin{pmatrix} Ri_0 \\ Gi_1 \\ Ri_2 \\ Gi_3 \\ Ri_4 \\ Gi_5 \\ Ri_6 \\ Gi_7 \\ Ri_{10} \\ Gi_{11} \\ Ri_{12} \\ Gi_{13} \\ Ri_{14} \\ Gi_{15} \end{pmatrix} = \begin{pmatrix} Rj_0 \\ Gj_1 \\ Rj_2 \\ Gj_3 \\ Rj_4 \\ Gj_5 \\ Rj_6 \\ Gj_7 \\ Rj_8 \\ Gj_9 \\ Rj_{10} \\ Gj_{11} \\ Rj_{12} \\ Gj_{13} \end{pmatrix}. \quad (8)$$

As described above, $Ri_{2p}$ and $Gi_{2p+1}$ (p is an integer that is no smaller than 0 and smaller than 7) represent pixel data of pixels arrayed in the horizontal direction in the photoelectric conversion element 122. In consecutive subscripts represent data that are thinned out in the readout. $Rj_{2r}$ and $Gj_{2r+1}$ (r is an integer that is no smaller than 0 and smaller than 6) represent pixel data that are actually readout by the pixel thinning readout and have consecutive subscripts corresponding to the readout order.

When Equation (8) is substituted into Equation (6), we obtain $$\begin{pmatrix} Rc_0 \\ Gc_1 \\ Rc_2 \\ Gc_3 \\ Rc_4 \\ Gc_5 \\ Rc_6 \\ Gc_7 \\ Rc_8 \\ Gc_9 \\ Rc_{10} \\ Gc_{11} \\ Rc_{12} \\ Gc_{13} \end{pmatrix} = \begin{pmatrix} 1 & 0 & 0 & 0 & 0 & 0 & 0 & 0 & 0 & 0 & 0 & 0 & 0 & 0 \\ 0 & \frac{13}{14} & 0 & \frac{1}{14} & 0 & 0 & 0 & 0 & 0 & 0 & 0 & 0 & 0 & 0 \\ 0 & 0 & \frac{12}{14} & 0 & \frac{2}{14} & 0 & 0 & 0 & 0 & 0 & 0 & 0 & 0 & 0 \\ 0 & 0 & 0 & \frac{11}{14} & 0 & \frac{3}{14} & 0 & 0 & 0 & 0 & 0 & 0 & 0 & 0 \\ 0 & 0 & 0 & 0 & \frac{10}{14} & 0 & \frac{4}{14} & 0 & 0 & 0 & 0 & 0 & 0 & 0 \\ 0 & 0 & 0 & 0 & 0 & \frac{9}{14} & 0 & \frac{5}{14} & 0 & 0 & 0 & 0 & 0 & 0 \\ 0 & 0 & 0 & 0 & 0 & 0 & \frac{11}{14} & 0 & \frac{3}{14} & 0 & 0 & 0 & 0 & 0 \\ 0 & 0 & 0 & 0 & 0 & 0 & 0 & \frac{21}{28} & 0 & \frac{7}{28} & 0 & 0 & 0 & 0 \\ 0 & 0 & 0 & 0 & 0 & 0 & \frac{3}{14} & 0 & \frac{11}{14} & 0 & 0 & 0 & 0 & 0 \\ 0 & 0 & 0 & 0 & 0 & 0 & 0 & \frac{5}{28} & 0 & \frac{23}{28} & 0 & 0 & 0 & 0 \\ 0 & 0 & 0 & 0 & 0 & 0 & 0 & 0 & \frac{4}{14} & 0 & \frac{10}{14} & 0 & 0 & 0 \\ 0 & 0 & 0 & 0 & 0 & 0 & 0 & 0 & 0 & \frac{3}{14} & 0 & \frac{11}{14} & 0 & 0 \\ 0 & 0 & 0 & 0 & 0 & 0 & 0 & 0 & 0 & 0 & \frac{2}{14} & 0 & \frac{12}{14} & 0 \\ 0 & 0 & 0 & 0 & 0 & 0 & 0 & 0 & 0 & 0 & 0 & \frac{1}{14} & 0 & \frac{13}{14} \end{pmatrix} \begin{pmatrix} Rj_0 \\ Gj_1 \\ Rj_2 \\ Gj_3 \\ Rj_4 \\ Gj_5 \\ Rj_6 \\ Gj_7 \\ Rj_8 \\ Gj_9 \\ Rj_{10} \\ Gj_{11} \\ Rj_{12} \\ Gj_{13} \end{pmatrix}. \quad (9)$$

This is distortion correction conversion that obtains 14 pixel data after 14/16 reduction conversion from the 14 pixel data that is actually sequentially read out by the pixel thinning readout.

The above-described linear distortion correction can be expanded to a two-dimensional array in the following way.

Equation (9) is expressed by $$C = AB. \quad (10)$$

where A is the conversion matrix that executes linear distortion compensation (i.e., in the above-described example, distortion compensation for the 14 pixel data obtained by thinning two of 16 pixels), B is a matrix with n rows and 1 column representing pixel data before distortion compensation, and C is a matrix with n rows and 1 column representing pixel data after distortion compensation. The readout data shown in FIG. 4 is expressed by a matrix $D_i$ given by $$D_i = \begin{pmatrix} Ri_{0,0} & Gi_{0,1} & Ri_{0,2} & Gi_{0,3} & Ri_{0,4} & Gi_{0,5} & Ri_{0,6} & Gi_{0,7} & Ri_{0,10} & Gi_{0,11} & Ri_{0,12} & Gi_{0,13} & Ri_{0,14} & Gi_{0,15} \\ Gi_{1,0} & Bi_{1,1} & Gi_{1,2} & Bi_{1,3} & Gi_{1,4} & Bi_{1,5} & Gi_{1,6} & Bi_{1,7} & Gi_{1,10} & Bi_{1,11} & Gi_{1,12} & Bi_{1,13} & Gi_{1,14} & Bi_{1,15} \\ Ri_{2,0} & Gi_{2,1} & Ri_{2,2} & Gi_{2,3} & Ri_{2,4} & Gi_{2,5} & Ri_{2,6} & Gi_{2,7} & Ri_{2,10} & Gi_{2,11} & Ri_{2,12} & Gi_{2,13} & Ri_{2,14} & Gi_{2,15} \\ Gi_{3,0} & Bi_{3,1} & Gi_{3,2} & Bi_{3,3} & Gi_{3,4} & Bi_{3,5} & Gi_{3,6} & Bi_{3,7} & Gi_{3,10} & Bi_{3,11} & Gi_{3,12} & Bi_{3,13} & Gi_{3,14} & Bi_{3,15} \\ Ri_{4,0} & Gi_{4,1} & Ri_{4,2} & Gi_{4,3} & Ri_{4,4} & Gi_{4,5} & Ri_{4,6} & Gi_{4,7} & Ri_{4,10} & Gi_{4,11} & Ri_{4,12} & Gi_{4,13} & Ri_{4,14} & Gi_{4,15} \\ Gi_{5,0} & Bi_{5,1} & Gi_{5,2} & Bi_{5,3} & Gi_{5,4} & Bi_{5,5} & Gi_{5,6} & Bi_{5,7} & Gi_{5,10} & Bi_{5,11} & Gi_{5,12} & Bi_{5,13} & Gi_{5,14} & Bi_{5,15} \\ Ri_{6,0} & Gi_{6,1} & Ri_{6,2} & Gi_{6,3} & Ri_{6,4} & Gi_{6,5} & Ri_{6,6} & Gi_{6,7} & Ri_{6,10} & Gi_{6,11} & Ri_{6,12} & Gi_{6,13} & Ri_{6,14} & Gi_{6,15} \\ Gi_{7,0} & Bi_{7,1} & Gi_{7,2} & Bi_{7,3} & Gi_{7,4} & Bi_{7,5} & Gi_{7,6} & Bi_{7,7} & Gi_{7,10} & Bi_{7,11} & Gi_{7,12} & Bi_{7,13} & Gi_{7,14} & Bi_{7,15} \\ Ri_{10,0} & Gi_{10,1} & Ri_{10,2} & Gi_{10,3} & Ri_{10,4} & Gi_{10,5} & Ri_{10,6} & Gi_{10,7} & Ri_{10,10} & Gi_{10,11} & Ri_{10,12} & Gi_{10,13} & Ri_{10,14} & Gi_{10,15} \\ Gi_{11,0} & Bi_{11,1} & Gi_{11,2} & Bi_{11,3} & Gi_{11,4} & Bi_{11,5} & Gi_{11,6} & Bi_{11,7} & Gi_{11,10} & Bi_{11,11} & Gi_{11,12} & Bi_{11,13} & Gi_{11,14} & Bi_{11,15} \\ Ri_{12,0} & Gi_{12,1} & Ri_{12,2} & Gi_{12,3} & Ri_{12,4} & Gi_{12,5} & Ri_{12,6} & Gi_{12,7} & Ri_{12,10} & Gi_{12,11} & Ri_{12,12} & Gi_{12,13} & Ri_{12,14} & Gi_{12,15} \\ Gi_{13,0} & Bi_{13,1} & Gi_{13,2} & Bi_{13,3} & Gi_{13,4} & Bi_{13,5} & Gi_{13,6} & Bi_{13,7} & Gi_{13,10} & Bi_{13,11} & Gi_{13,12} & Bi_{13,13} & Gi_{13,14} & Bi_{13,15} \\ Ri_{14,0} & Gi_{14,1} & Ri_{14,2} & Gi_{14,3} & Ri_{14,4} & Gi_{14,5} & Ri_{14,6} & Gi_{14,7} & Ri_{14,10} & Gi_{14,11} & Ri_{14,12} & Gi_{14,13} & Ri_{14,14} & Gi_{14,15} \\ Gi_{15,0} & Bi_{15,1} & Gi_{15,2} & Bi_{15,3} & Gi_{15,4} & Bi_{15,5} & Gi_{15,6} & Bi_{15,7} & Gi_{15,10} & Bi_{15,11} & Gi_{15,12} & Bi_{15,13} & Gi_{15,14} & Bi_{15,15} \end{pmatrix} \quad (11)$$

In equation (11), the omitted portions are drawn with lines. Let $D_0$ be a uniform 14 (pixels)×14 (pixels) array. Conversion for distortion correction in the vertical direction after distortion correction in the horizontal direction is given by using A in Equation (10) by $$D_c = AA^T D_i. \quad (12)$$

where $A^T$ is the transpose of A.

The linear distortion conversion, i.e., rewrite from Equation (4) to Equation (6) can also be considered as follows.

(1) When pixel data at a position X is read out and pixel data at a position X+2 is also readout, the coefficients in Equation (4) are directly used as the weighting coefficients of pixel data.

(2) When the pixel data at the position X is read out and the pixel data at the position X+2 is riot readout, pixel data at a position X+4 is read out instead. A weighting coefficient x of the pixel data at the position X is changed to x'=0.5(x+1). The weighting coefficient of the pixel data at the position X+4 is the residual of the changed coefficient x' to 1, i.e., 1−x'.

(3) When the pixel data at the position X is not readout and the pixel data at the position X+2 is read out, the readout position of the position X is shifted ahead by two to X−2. The weighting coefficient x of the pixel data at the position X−2 is changed to x'=0.5x. The weighting coefficient of the pixel data at the position X+2 is the residual of the changed coefficient to 1, i.e., 1−x'.

Hence, instead of executing distortion correction by making the pixel readout positions correspond to the correction coefficients by using the lookup table (LUT), the distortion correction coefficients may directly be calculated from the readout rule by using the arithmetic processing function of the CPU.

Distortion correction after thinning readout in the color image sensing element with a primary color Bayer matrix has been described above. The distortion correction after thinning readout may be executed even for a monochrome image sensing element or another color filter matrix in a similar manner.

When the image signal of the photoelectric conversion readout unit is directly stored in the memory, and the operation is performed by address designation, the above-described problem of phase can be avoided. Pipeline processing at a higher speed will be described.

FIG. 6 shows an example in which two of eight pixels are thinned out in both the horizontal and vertical directions. For example, the readout of the first row with thinning in the horizontal direction will be examined. When the upper left corner in FIG. 6 is defined as a reference, the readout pixel positions are $Ri_0$, $Gi_1$, $Ri_2$, $Gi_3$, $Ri_4$, $Gi_5$, $Ri_6$, and $Gi_7$. This rule is repeated. The matrix expression of distortion correction (conversion) in this example is given by $$\begin{pmatrix} Rc_0 \\ Gc_1 \\ Rc_2 \\ Gc_3 \\ Rc_4 \\ Gc_5 \end{pmatrix} = \begin{pmatrix} 1 & 0 & 0 & 0 & 0 & 0 \\ 0 & \frac{5}{6} & 0 & \frac{1}{6} & 0 & 0 \\ 0 & 0 & \frac{5}{6} & 0 & \frac{1}{6} & 0 \\ 0 & 0 & 0 & \frac{3}{4} & 0 & \frac{1}{4} \\ 0 & 0 & \frac{1}{6} & 0 & \frac{5}{6} & 0 \\ 0 & 0 & 0 & \frac{1}{12} & 0 & \frac{11}{12} \end{pmatrix} \begin{pmatrix} Ri_0 \\ Gi_1 \\ Ri_2 \\ Gi_3 \\ Ri_6 \\ Gi_7 \end{pmatrix}. \quad (13)$$

Figure 7:
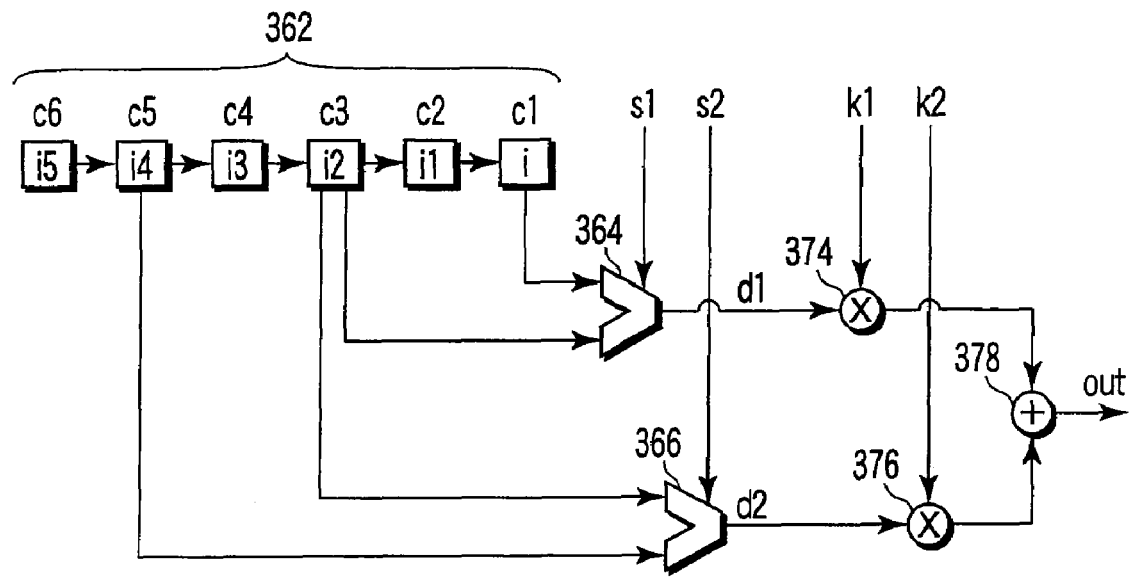
FIG. 7 shows the arrangement of a filter processing unit for a photoelectric conversion element including a single-chip color image sensing element.

The pipeline processing is executed by a filter processing unit shown in FIG. 7. A shift register 362 shifts held image data by one to the right for each operation corresponding to the clock. A selector 364 selects one of the first and third pixel data of five adjacent pixel data held by the shift register 362 in accordance with the state of s1. A selector 366 selects one of the third and fifth pixel data of five adjacent pixel data held by the shift register 362 in accordance with the state of s2.

A multiplier 374 multiplies an output d1 from the selector 364 by a coefficient k1 of weighted addition. A multiplier 376 multiplies an output d2 from the selector 366 by a coefficient k2 of weighted addition. An adder 378 adds the output from a multiplier 394 and the output from a multiplier 396.

Table 1 shows the operation (state transition) of pipeline processing by the filter processing unit shown in FIG. 7.

TABLE 1

| c1 | c2 | c3 | c4 | c5 | c6 | s1 | s2 | d1 | d2 | k1 | k2 | out |
|---|---|---|---|---|---|---|---|---|---|---|---|---|
| i0 | i1 | i2 | i3 | i4 | i5 | 0 | 0 | i2 | i4 | 1 | 0 | $1 \times i2 + 0 \times i4$ |
| i1 | i2 | i3 | i4 | i5 | i6 | 0 | 0 | i3 | i5 | 5/6 | 1/6 | $5/6 \times i3 + 1/6 \times i5$ |
| i2 | i3 | i4 | i5 | i6 | i7 | 0 | 0 | i4 | i6 | 5/6 | 1/6 | $5/6 \times i4 + 1/6 \times i6$ |
| i3 | i4 | i5 | i6 | i7 | i8 | 0 | 0 | i5 | i7 | 3/4 | 1/4 | $3/4 \times i5 + 1/4 \times i7$ |
| i4 | i5 | i6 | i7 | i8 | i9 | 1 | 1 | i4 | i6 | 1/6 | 5/6 | $1/6 \times i4 + 5/6 \times i6$ |
| i5 | i6 | i7 | i8 | i9 | i10 | 1 | 1 | i5 | i7 | 1/12 | 11/12 | $1/12 \times i5 + 11/12 \times i7$ |
| i6 | i7 | i8 | i9 | i10 | i11 | 0 | 0 | i8 | i10 | 1 | 0 | $1 \times i8 + 0 \times i10$ |
| i7 | i8 | i9 | i10 | i11 | i12 | 0 | 0 | i9 | i11 | 5/6 | 1/6 | $5/6 \times i9 + 1/6 \times i11$ |
| i8 | i9 | i10 | i11 | i12 | i13 | 0 | 0 | i10 | i12 | 5/6 | 1/6 | $5/6 \times i10 + 1/6 \times i12$ |
| i9 | i10 | i11 | i12 | i13 | i14 | 0 | 0 | i11 | i13 | 3/4 | 1/4 | $3/4 \times i11 + 1/4 \times i13$ |
| i10 | i11 | i12 | i13 | i14 | i15 | 1 | 1 | i10 | i12 | 1/6 | 5/6 | $1/6 \times i10 + 5/6 \times i12$ |
| i11 | i12 | i13 | i14 | i15 | i16 | 1 | 1 | i11 | i13 | 1/12 | 11/12 | $1/12 \times i11 + 11/12 \times i13$ |
| i12 | i13 | i14 | i15 | i16 | i17 | 0 | 0 | i14 | i16 | 1 | 0 | $1 \times i14 + 0 \times i16$ |
| i13 | i14 | i15 | i16 | i17 | i18 | 0 | 0 | i15 | i17 | 5/6 | 1/6 | $5/6 \times i15 + 1/6 \times i17$ |
| i14 | i15 | i16 | i17 | i18 | i19 | 0 | 0 | i16 | i18 | 5/6 | 1/6 | $5/6 \times i16 + 1/6 \times i18$ |
| i15 | i16 | i17 | i18 | i19 | i20 | 0 | 0 | i17 | i19 | 3/4 | 1/4 | $3/4 \times i17 + 1/4 \times i19$ |
| i16 | i17 | i18 | i19 | i20 | i21 | 1 | 1 | i16 | i18 | 1/6 | 5/6 | $1/6 \times i16 + 5/6 \times i18$ |
| i17 | i18 | i19 | i20 | i21 | i22 | 1 | 1 | i17 | i19 | 1/12 | 11/12 | $1/12 \times i17 + 11/12 \times i19$ |
| i18 | i19 | i20 | i21 | i22 | i23 | 0 | 0 | i20 | i22 | 1 | 0 | $1 \times i20 + 0 \times i22$ |
| i19 | i20 | i21 | i22 | i23 | i24 | 0 | 0 | i21 | i23 | 5/6 | 1/6 | $5/6 \times i21 + 1/6 \times i23$ |
| i20 | i21 | i22 | i23 | i24 | i25 | 0 | 0 | i22 | i24 | 5/6 | 1/6 | $5/6 \times i22 + 1/6 \times i24$ |

The pixel data sequence (i0, i1, i2, . . . ) supplied to the shift register 362 shifts to the right for each operation according to the clock from the initial state in which c1=i0, c2=i1, and c3=i2. Accordingly, the selector 364 selects c3 when s1 is 0 (d1=c3) and c1 when s1 is 1 (d1=c1). On the other hand, the selector 366 selects c5 when s2 is 0 (d2=c5) and c3 when s2 is 1 (d2=c3). In synchronism with the clock, the coefficient k1 is supplied from the memory in the filter coefficient setting unit 154 to the multiplier 374, and the coefficient k2 is supplied to the multiplier 376. The adder 378 outputs out=k1×d1+k2×d2.

As is apparent from Table 1, when sequential data shift, selector switching according to the states of s1 and s2, outputs of the weighting coefficients k1 and k2 corresponding to the thinning rule indicated by Equation (6), and weighted addition operation are performed synchronously, pipeline processing including pixel phase operation (selector switching) is executed.

When there is only one kind of color information on a single image sensing element, as in a monochrome or 3-chip color image sensing element unlike an image sensing element having color filter arrays (CFA) such as a Bayer matrix or a complementary color filter matrix, the interval of one pixel need not be prepared to process pixels of the same color in distortion correction, unlike the CFA of a Bayer matrix. In addition, thinning need not be executed for two consecutive pixels to make signals of the same color have the same phase (to execute the readout in a predetermined order of, e.g., R, G, R, G, . . . )

In a single-color image sensing element, the weighed addition of adjacent pixels is done while selecting data. Hence, distortion correction (conversion) is expressed by $$Pc_2 = aPi_1 + (1-a)Pi_2, \quad (14)$$

where Pc is pixel data after conversion, and Pi is pixel data as the conversion source.

Figure 8:
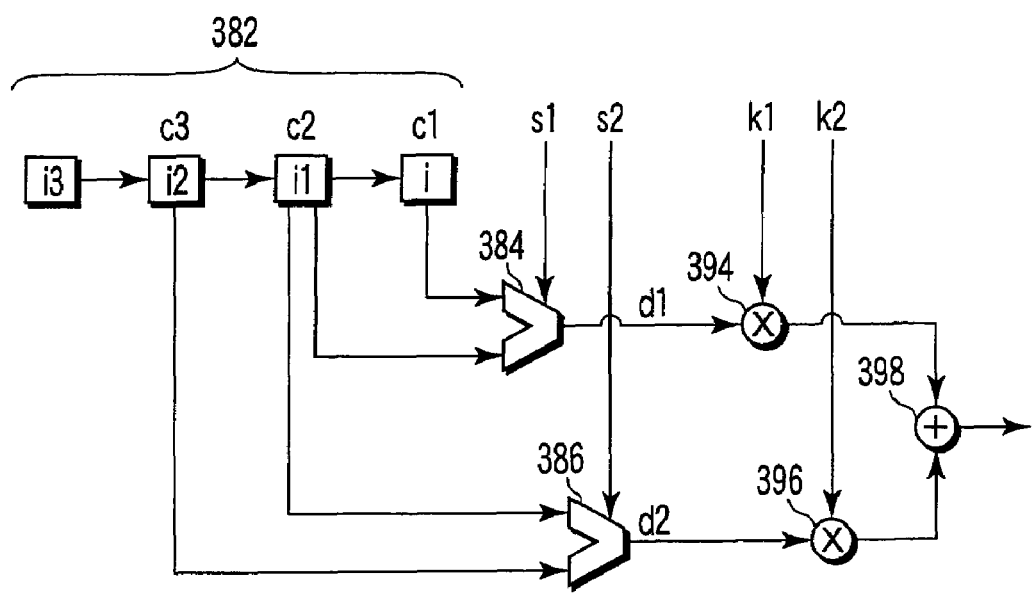
FIG. 8 shows the arrangement of a filter processing unit for a photoelectric conversion element including a monochrome image sensing element or a multiple-chip color image sensing element.

The pipeline processing is executed by a filter processing unit shown in FIG. 8. A shift register 382 shifts held image data by one to the right for each operation corresponding to the clock. A selector 368 selects one of the first and second pixel data (C1 and C2) of three adjacent pixel data in accordance with the state of s1. A selector 386 selects one of the second and third pixel data (C2 and C3) of three adjacent pixel data in accordance with the state of s2.

A multiplier 394 multiplies the output d1 from the selector 384 by the coefficient k1 of weighted addition. A multiplier 396 multiplies the output d2 from the selector 386 by the coefficient k2 of weighted addition. An adder 378 adds the output from the multiplier 394 and the output from the multiplier 396.

The image sensing apparatus of this embodiment, in the thinning readout mode, reads out image data acquired by the photoelectric conversion element thinning out it in the hardware in at least vertical direction and, preferably, in both the horizontal and vertical directions. Hence, the image sensing apparatus of this embodiment can read out image data in a shorter time than a normal image sensing apparatus that reads out all image data from the photoelectric conversion elements and then thins out the image data by using software.

The suitable adaptive range of size change by thinning readout+distortion correction processing and the advantages of switching the readout scheme (full-pixel readout mode, averaging readout mode, and thinning readout mode) and subsequent image signal processing in accordance with the image scaling ratio will be described below.

Tables 2 to 4 show sensory evaluation of typical objects so as to indicate the superiority in image quality between (1) images by thinning readout+distortion correction processing and (2) images by averaging readout+linear enlargement processing at various reduction magnifications. More specifically, Table 2 shows the evaluation result of objects such as a building and a structure. Table 3 shows the evaluation result of objects such as a person and a natural landscape Table 4 shows the evaluation result of objects such as a resolution chart and a line drawing. In these tables, "1" represents that thinning readout+distortion correction processing is superior, and "2" represents that averaging readout+linear enlargement processing is superior. In addition, "Δ" represents that both processing operations are equal.

TABLE 2

Object: Building, Structure

| Reduction magnification | Contrast | Resolution | Distortion | Luminance moiré | Color moiré |
|---|---|---|---|---|---|
| 93% | 1 | 1 | 1 | 1 | 1 |
| 91% | 1 | 1 | 1 | 1 | 1 |
| 87% | 1 | 1 | 1 | 1 | 1 |
| 83% | 1 | 1 | 1 | 1 | 1 |
| 80% | 1 | 1 | 1 | 1 | 1 |
| 75% | 1 | 1 | Δ | 1 | 1 |
| 71% | Δ | Δ | 2 | Δ | Δ |
| 66% | 2 | 2 | 2 | 2 | 2 |
| 60% | 2 | 2 | 2 | 2 | 2 |

TABLE 3

Object: Person, Natural landscape

| Reduction magnification | Contrast | Resolution | Distortion | Luminance moiré | Color moiré |
|---|---|---|---|---|---|
| 93% | 1 | 1 | 1 | 1 | 1 |
| 91% | 1 | 1 | 1 | 1 | 1 |
| 87% | 1 | 1 | 1 | 1 | 1 |
| 83% | 1 | 1 | 1 | 1 | 1 |
| 80% | 1 | 1 | 1 | 1 | 1 |
| 75% | 1 | 1 | 1 | 1 | 1 |
| 71% | 1 | Δ | Δ | Δ | Δ |
| 66% | Δ | 2 | 2 | 2 | 2 |
| 60% | 2 | 2 | 2 | 2 | 2 |

TABLE 4

Object: Resolution chart, Line drawing

| Reduction magnification | Contrast | Resolution | Distortion | Luminance moiré | Color moiré |
|---|---|---|---|---|---|
| 93% | 1 | 1 | 1 | 1 | 1 |
| 91% | 1 | 1 | 1 | 1 | 1 |
| 87% | 1 | 1 | 1 | 1 | 1 |
| 83% | 1 | 1 | 1 | 1 | 1 |
| 80% | 1 | 1 | 1 | 1 | 1 |
| 75% | 1 | 1 | Δ | 1 | 1 |
| 71% | Δ | Δ | 2 | Δ | Δ |
| 66% | 2 | 2 | 2 | 2 | 2 |
| 60% | 2 | 2 | 2 | 2 | 2 |

Reasoning of the sensory evaluation will briefly be described here.

When the reduction magnification is high, e.g., in the mode to read out 14 of 16 pixels (corresponding to conversion given by Equation (6)), the quality of the images obtained by thinning readout+distortion correction processing bears comparison with that of the images obtained by processing of changing the size by linear interpolation after the full-pixel readout (corresponding to conversion given by Equation (1)). However, when the reduction magnification is low, e.g. in the mode to read out four of six pixels, the quality is poor. A possible reason for this is as follows. Since the ratio of pixels thinned out increases as the reduction magnification decreases, the ratio of omitted image information increases. Hence, reconstruction by linear interpolation represented from Equation (6) is difficult.

The images obtained by averaging readout+linear enlargement processing are inferior in resolution and contrast. However, when the reduction magnification is low (e.g., 60%), the degradation in band by enlargement (in ½ sampling, original data is reduced to 50%; to obtain a 60% image, 120% enlargement is executed) is small.

In consideration of the above facts, when the reduction magnification is high, the thinning readout mode is preferably selected. When the reduction magnification is low, averaging readout+enlargement by linear interpolation is preferably selected.

The type of object will be examined. For the object of a natural image, importance is placed on the texture and resolution. For the object of a natural image, thinning readout+distortion correction processing is superior to averaging readout+linear enlargement processing from the viewpoint of band degradation and moiré reduction. Hence, for the object of a natural image, the reduction magnification to switch between the thinning readout mode and the averaging readout mode is preferably set relatively low (e.g., approximately 66%).

For an object such as a line drawing, importance is placed on reduction of distortion because the contrast and resolution can be recovered to some extent by another image processing (band enhancement using a filter). For this reason, for an object such as a line drawing, averaging readout+linear enlargement processing is superior to thinning readout+distortion correction processing. Hence, for an object such as a line drawing, the reduction magnification to switch between the thinning readout mode and the averaging readout mode is preferably set relatively high (e.g., approximately 75%).

By switching between the thinning readout mode and averaging readout mode (and subsequent image signal processing) in accordance with the reduction magnification, a high-resolution image can be obtained in a wide reduction magnification range.

As another advantage of switching between the readout scheme and subsequent image signal processing in accordance with the reduction magnification, the number of magnification steps can be increased in a wide magnification range.

A scaling ratio X in the thinning readout is given by $$X = \frac{n-k}{n} \quad (15)$$

(n: unit of thinning block, k: number of pixels to be thinned out). That is, the scaling ratio X is given by a ratio of integers.

When the reduction magnification is relatively high, size change can be done at a relatively fine interval from, e.g., 20/22=91% (mode to read out 20 of 22 pixels) to 18/20=90%, 16/18=89%, 14/16=87.5%, 12/14=85.7%, and 10/12=83.3%.

However, when the reduction magnification is relatively low, the scaling ratio interval becomes large, like, e.g., 6/8=75%, 10/14=71%, 4/6=66%, and 6/10=60%. Although a reduction magnification such as 8/14=57% is also possible, reconstruction by distortion correction by linear interpolation becomes difficult because the ratio of pixels to be thinned out in a block increases.

Hence, by switching between the thinning readout mode and averaging readout mode (and subsequent image signal processing) in accordance with the reduction magnification, the reduction magnification can be designated at a fine interval.

Figure 9:
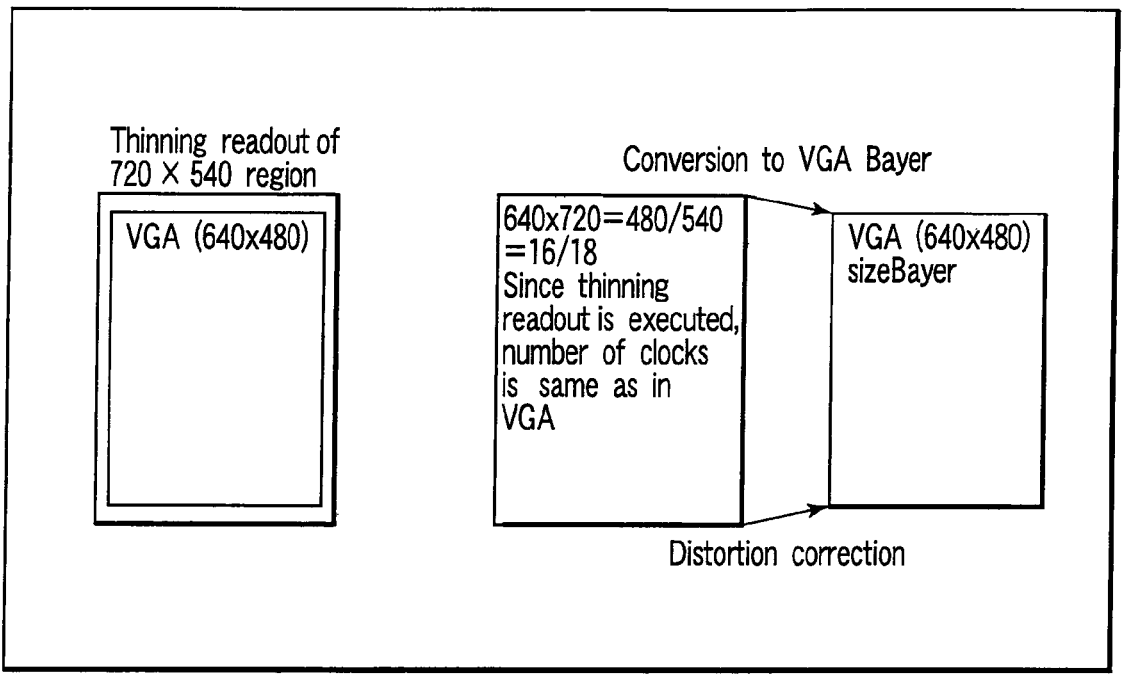
FIG. 9 shows size change corresponding to thinning readout+distortion correction processing.

FIG. 9 shows size change corresponding to thinning readout+distortion correction processing. More specifically, FIG. 9 shows an example in which a 720×540 pixel area is changed to VGA (640×480) on the photoelectric conversion element.

In this example, the rule of reading out 16 pixels by thinning out two of 18 pixels is repeated. The image size is reduced to 16/18=8/9, i.e., about 89% (720→640, and 540→480).

Figure 10:
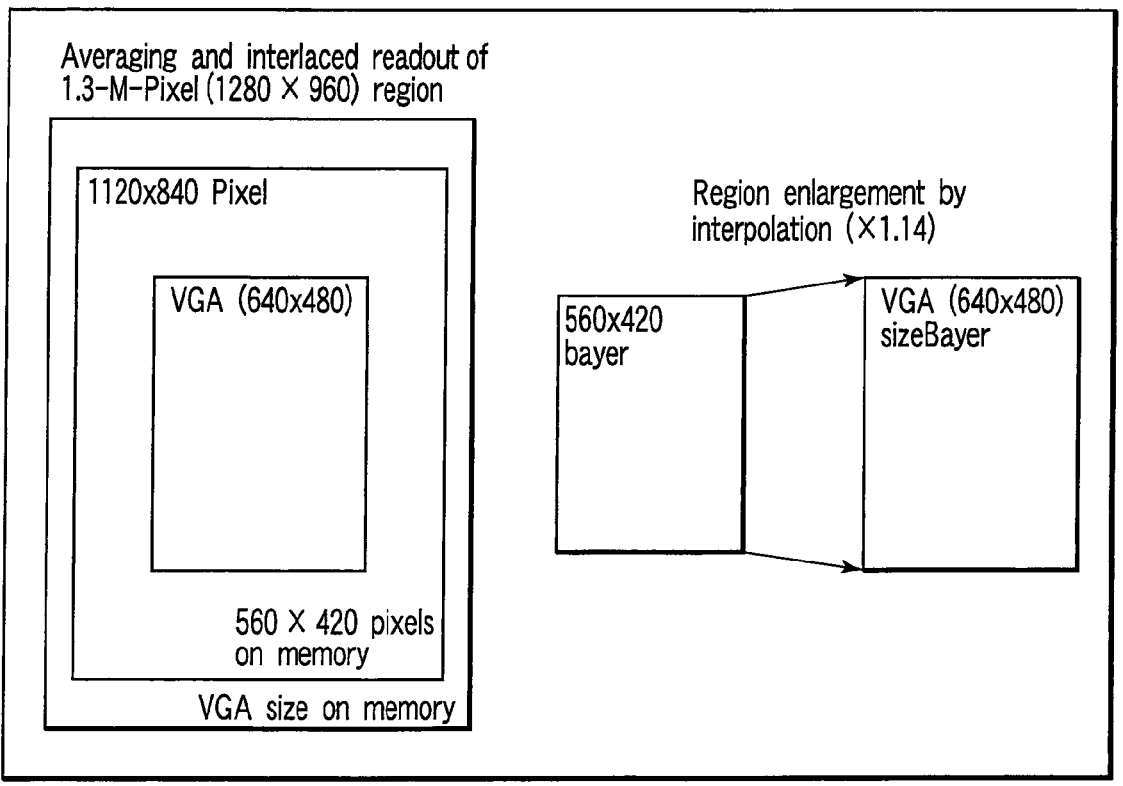
FIG. 10 shows size change corresponding to averaging readout+linear interpolation processing.

FIG. 10 shows size change corresponding to averaging readout+linear interpolation processing. More specifically, FIG. 10 shows an example in which 1120×840 pixels is changed to the VGA size. In this example, horizontal 2-pixel averaging readout vertical 2-line interlaced readout is executed in accordance with the VGA clock, thereby reading out an area of 1280×960 pixels in advance. A portion corresponding to an area of 1120×840 pixels is extracted and changed to the VGA size. Since 2-pixel averaging is executed, the memory area corresponding to the area of 1120×840 pixels on the photoelectric conversion element is 560×420. This area is extracted and enlarged by linear interpolation to change the size (640/560=about 1.14 times). At this time, the image size is reduced to 640/1120=57% on the basis of the image size on the photoelectric conversion element.

FIG. 11 shows readout scheme switching and size change corresponding to the scaling ratio in the image sensing apparatus of this embodiment. For a scaling ratio of 100% or more, size change is executed by full-pixel readout+enlargement processing by linear interpolation.

For a scaling ratio or reduction ratio of approximately 70% to 100%, size change is executed by thinning readout+distortion correction processing. For a scaling ratio or reduction ratio lower than 70%, size change is executed by 2:1 averaging readout+linear interpolation processing. The readout area on the image sensing element in the 2:1 averaging readout is twice the readout area on the image sensing element in the full-pixel readout.

As is apparent from the above description, in the image sensing apparatus according to this embodiment, a high-resolution image can be obtained in a wide scaling ratio range by switching between the readout scheme and subsequent image signal processing in accordance with the image scaling ratio. In addition, at a scaling ratio lower than 100%, the scaling ratio can be designated at a fine interval.

Second Embodiment

This embodiment is particularly directed to an image sensing apparatus that is suitably used to sense a moving image.

FIG. 12 shows the arrangement of an image sensing apparatus according to the second embodiment of the present invention. The same reference numerals as in the image sensing apparatus 100 of the first embodiment denote the same elements in FIG. 12, and a detailed description thereof will be omitted to avoid any repetitive description.

An image sensing apparatus 200 of this embodiment has an imaging optical system 110 that forms an optical image of an object and an image sensing device 220 that continuously outputs an image signal in a predetermined region of the optical image formed by the imaging optical system 110. That is, the image signal output from the image sensing device 220 is a moving image signal, which comprises image data of a plurality of frames that time-serially continue.

The image sensing device 220 has a two-dimensional photoelectric conversion element 222 that photoelectrically converts the optical image formed by the imaging optical system 110 to acquire image data (pixel data set) and a readout control unit 224 that continuously reads out the image data acquired by the photoelectric conversion element 222 in accordance with a supplied readout rule.

The image sensing apparatus 200 also has an image scaling ratio selection unit 132 that selects the scaling ratio of the image to be output, a readout scheme selection unit 234 that selects, in accordance with the selected image scaling ratio, the readout scheme of the image data to be read out from the photoelectric conversion element 222 by the readout control unit 224, and a readout rule supply unit 240 that supplies, to the image sensing device 220, a readout rule corresponding to the readout scheme selected by the readout scheme selection unit 234.

The readout scheme selection unit 234 selects one of the thinning readout mode, horizontal averaging vertical interlaced readout mode, and vertical interlaced readout mode in accordance with the selected mage scaling ratio. The readout rule supply unit 240 includes a thinning readout rule setting unit 242 that sets a readout rule corresponding to the thinning readout mode, a horizontal averaging vertical interlaced readout rule setting unit 244 that sets a readout rule corresponding to the horizontal averaging vertical interlaced readout mode, and a vertical interlaced readout rule setting unit 246 that sets a readout rule corresponding to the vertical interlaced readout mode.

More specifically, for an image scaling ratio lower than 100%, i.e., image reduction, the readout scheme selection unit 234 selects one of the thinning readout mode and horizontal averaging vertical interlaced readout mode. For an image scaling ratio of 100% or more, i.e., image enlargement, the readout scheme selection unit 234 selects the vertical interlaced readout mode.

For an image scaling ratio lower than 100%, the readout scheme selection unit 234 selects one of the thinning readout mode and horizontal averaging vertical interlaced readout mode on the basis of the image scaling ratio and an important one of image quality factors such as contrast, resolution, distortion, luminance moiré, and color moiré of the image to be output.

The image sensing apparatus 200 also has a distortion correction unit 150 that executes distortion correction for the image signal output from the image sensing device in the thinning readout mode, a readout phase control unit 252 that changes, for each frame, the reference position of an area (readout area) of image data to be read out from the photoelectric conversion element 222 by the readout control unit 224 in the thinning readout mode, and an image area selection processing unit 254 that selects an area of a region common to all frames of the corrected image signal output from the distortion correction unit 150 on the basis of the reference position of the readout area that is changed for each frame by the readout phase control unit 252 in the thinning readout mode. Details of the distortion correction unit 150 are the same as described in the first embodiment.

The readout phase control unit 252 changes the reference position of the readout area for each frame, and the image area selection processing unit 254 selects the area of a region common to all frames. Accordingly, the thinning readout rule setting unit 242 sets a readout rule so that the readout control unit 224 reads out image data in a wider area than the region of the image to be output.

The readout control unit 224 in the image sensing device 220 continuously reads out image data (pixel data of one frame) in a corresponding area in the pixel matrix in the photoelectric conversion element 222 on the basis of the readout rule set by the thinning readout rule setting unit 242 and the reference position of the readout area set by the readout phase control unit 252. As a result, the image sensing device 220 outputs a moving image signal comprising image data of a plurality of frames that time-serially continue.

The image sensing apparatus 200 also has a plurality of storage units, e.g., two frame memories 272 and 274, that temporarily store image data of a plurality of frames of the image signal output from the image area selection processing unit 254 in the thinning readout mode or the image signal output from the image sensing device 220 in the horizontal averaging vertical interlaced readout mode and vertical interlaced readout mode.

The image sensing apparatus 200 also has an interframe arithmetic processing unit 282 that generates new image data by executing weighted averaging for the image data of a plurality of frames stored in the frame memories 272 and 274 in the thinning readout mode.

The image sensing apparatus 200 also has an interframe interpolation arithmetic processing unit 284 that executes interframe interpolation for image data of a plurality of frames stored in the frame memories 272 and 274 in the horizontal averaging vertical interlaced readout mode and vertical interlaced readout mode (in the interlaced readout, position and line data are omitted between continuous frames; the data (line data) of the omitted portions are compensated by adjacent frame data) and a linear interpolation size change unit 286 that executes size change by linear interpolation in accordance with the image scaling ratio for the image signal output from the interframe interpolation arithmetic processing unit 284 in the horizontal averaging vertical interlaced readout mode and vertical interlaced readout mode.

In addition, the image sensing apparatus 200 has a first selector 262 that selectively sends the image signal output from the image sensing device 220 to one of the distortion correction unit 150 and frame memories 272 and 274 in accordance with the readout scheme selected by the readout scheme selection unit 234 and second selectors 276 and 278 that selectively send the image signals respectively from the frame memories 272 and 274 to one of the interframe arithmetic processing unit 282 and interframe interpolation arithmetic processing unit 284.

When the readout scheme selection unit 234 selects the thinning readout mode, the first selector 262 sends the image signal from the image sensing device 220 to the frame memories 272 and 274 through the distortion correction unit 150 and image area selection processing unit 254. The second selectors 276 and 278 send the image signals respectively from the frame memories 272 and 274 to the image signal processing unit 172 through the interframe arithmetic processing unit 282.

On the other hand, when the readout scheme selection unit 234 selects the horizontal averaging vertical interlaced readout mode or vertical interlaced readout mode, the first selector 262 sends the image signal from the image sensing device 220 directly to the frame memories 272 and 274. The second selectors 276 and 278 send the image signals respectively from the frame memories 272 and 274 to the image signal processing unit 172 through the interframe interpolation arithmetic processing unit 284 and linear interpolation size change unit 286.

In moving image sensing by a conventional video system, an interlaced scanning method is often used, in which 2 fields=1 frame. Image flicker by interlaced scanning is unnoticeable at a general frame rate of 1/30. If anything, with the interfaced scanning, image information in a wide region can be obtained within the same time as in full scanning, and a high-resolution image can be obtained at a high speed by interpolation between fields.

In the image sensing apparatus 200 of this embodiment, in the vertical interlaced readout mode, pixel data is alternately read out in every other line unit for every two fields that are adjacent time-serially to form one frame in accordance with the generally well-known interlaced scanning method. As a result, an image with few flicker can be obtained by the effect of interpolation between line units.

The line unit indicates the base unit of repetition along the arrangement of lines in the filter array. In, e.g., the Bayer matrix, the line unit includes two actual pixel lines.

In the image sensing apparatus 200 of this embodiment, in the horizontal averaging vertical interlaced readout mode, pixel data is read out in every other line unit for every two fields that are adjacent time-serially to form one frame while averaging two corresponding pixel data for every two pixel units in each line.

The pixel unit indicates the base unit of repetition along each line in the filter array. In, e.g., the Bayer matrix, one pixel unit includes two pixels (in, e.g., FIG. 13, a set of R and G of the first line).

Figure 13:
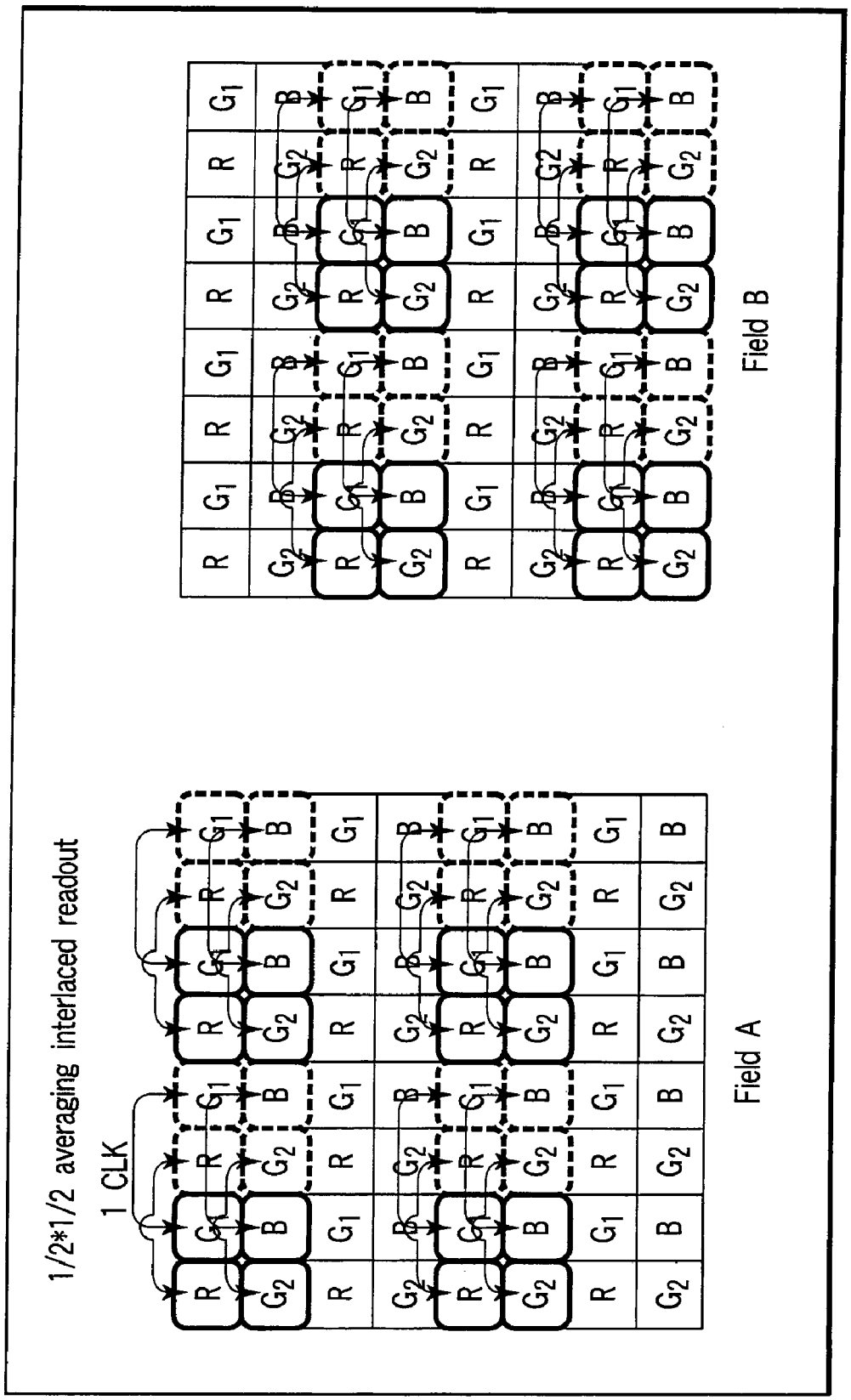
FIG. 13 schematically shows pixel data of two fields that are adjacent time-serially to form one frame, the pixel data being read out by a horizontal averaging vertical interlaced readout.

FIG. 13 schematically shows pixel data of two fields that are adjacent time-serially to form one frame, the pixel data being read out by the horizontal averaging vertical interlaced readout.

As shown in FIG. 13, in each field, pixel data is read out in every other line unit, i.e., every other line pair in each field. In each line, two corresponding pixel data for every two pixel units, i.e., two pixel data of the same type for every four pixels are read out while averaging them by a weight of ½:½. That is, two pixel data corresponding to four pixels are read out by one clock (CLK).

As a result of such readout, an image with few flicker is obtained by the effect of interpolation between pixel units and between line units.

In the image sensing apparatus 200 of this embodiment, in the thinning readout mode, the interlaced scanning interpolates omitted pixel data between two fields so that the omitted pixel data is interpolated between two consecutive frames.

For this purpose, the readout phase control unit 252 changes, for each frame, the reference position of the area (readout area) of pixel data to be read out with thinning-out from the photoelectric conversion element 222 by the readout control unit 224. More specifically, the readout phase control unit 252 periodically changes, for each frame, the reference position of the readout area in accordance with a predetermined rule.

As a consequence, pixel data at specific positions in the photoelectric conversion element 222 that is omitted for thinning readout in the image data of a specific frame is contained in the image data of another frame. That is, it can be avoided that pixel data at specific positions in the photoelectric conversion element 222 is always omitted from the image signal output from the image sensing device 220.

Figure 14:
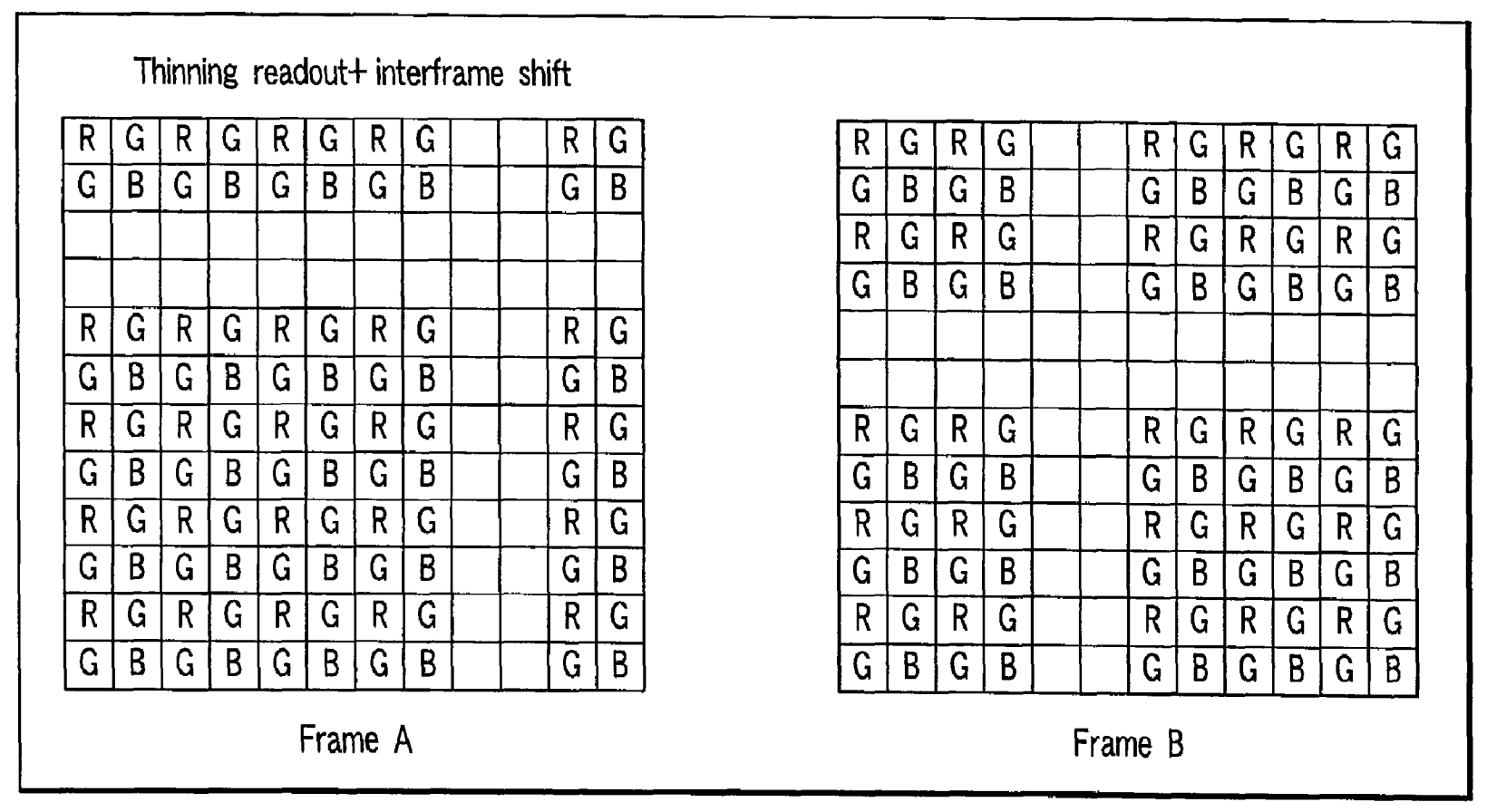

FIG. 14 schematically shows pixel data in the same area of two frames (frame A and frame B) that are adjacent time-serially, the pixel data being read out by 10/12 thinning readout and readout area reference position shift processing.

As is apparent from FIG. 14, for example, the image data (pixel data set) of the frame B contains pixel data that are skipped in reading out the image data of the frame A, i.e., pixel data omitted in the image data of the frame A. That is, the image data of two frames complementarily contain each other's omitted pixel data.

The interframe arithmetic processing unit 282 executes processing of interpolating omitted pixel data for the image data of consecutive frames stored in the frame memories 272 and 274. For example, addition of ½:½ is executed for the image data of two consecutive frames. As a result, the same effect as in interframe interpolation, i.e., deinterlacing processing by the well-known interlaced scanning method is obtained, and an image with few flicker is obtained.

Figures 15, 16:
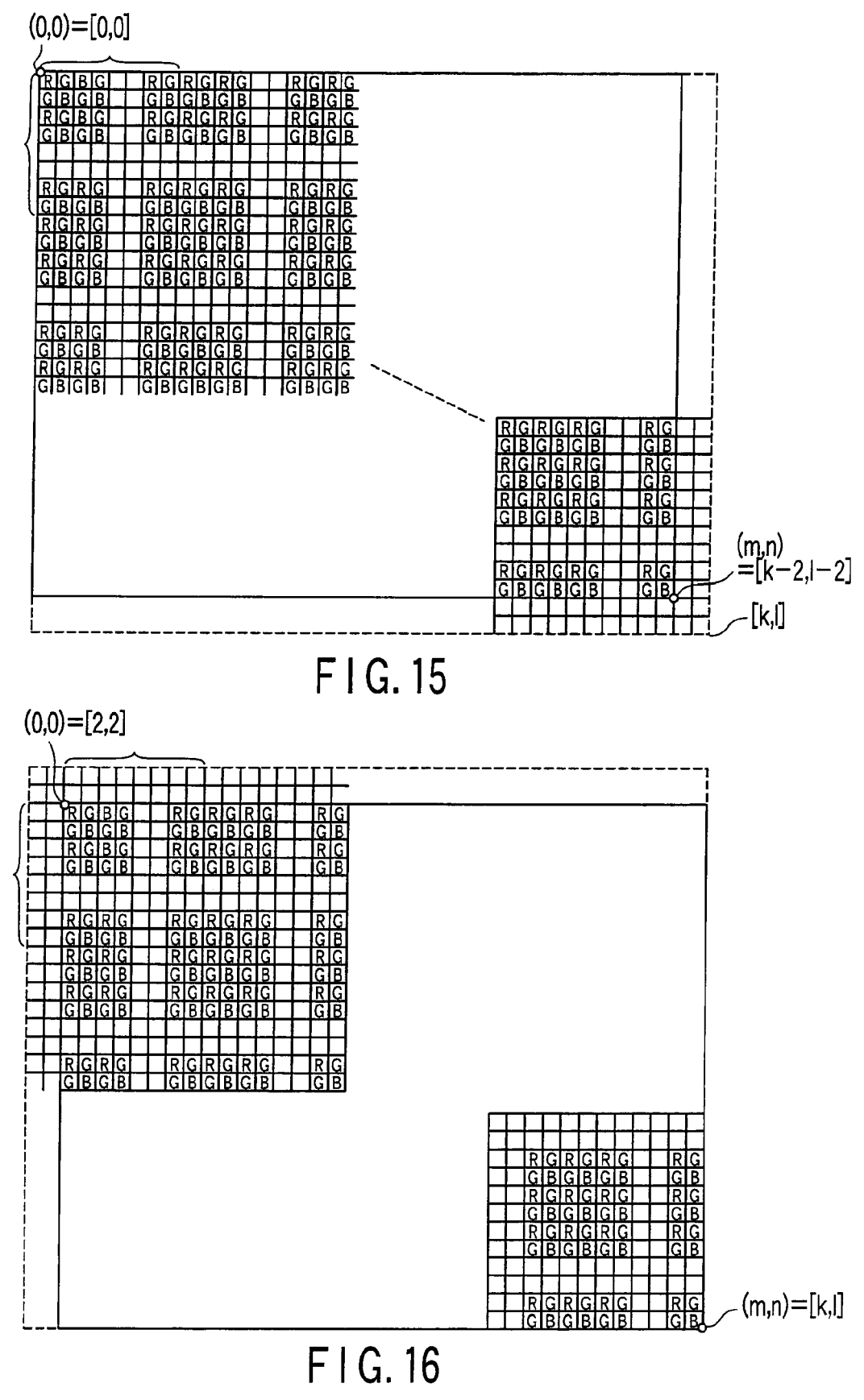

FIGS. 15 and 16 schematically show the shift of the reference position of the readout area in a readout by repeating 6/8 thinning readout. Referring to FIGS. 15 and 16, [x, y] represents the pixel position of the pixel matrix in the photoelectric conversion element 122, and (x, y) represents the pixel data array in the readout area.

As shown in FIGS. 15 and 16, the number of pixels of the photoelectric conversion element 122 is k in the horizontal direction and l in the vertical direction. Hence, the position of the pixel at the upper left of the photoelectric conversion element 122 is expressed as [0, 0], and the position of the pixel at the lower right is expressed as [k, l]. The number of pixels in the readout area of one frame is m in the horizontal direction and n in the vertical direction. Hence, the readout start position at the upper left of the frame is expressed as (0, 0), and the readout end position at the lower right is expressed as (m, n). The frame readout area shown in FIG. 16 is shifted by +2 pixels in the horizontal direction and +2 pixels in the vertical direction from the frame readout area shown in FIG. 15.

In the frame shown in FIG. 15, the readout start position (0, 0) at the upper left matches the upper left pixel position [0, 0] of the photoelectric conversion element 122. That is, $$(0,0)=[0,0]. \quad (16)$$

The readout end position (m, n) is given by $$(m,n)=[k-2,l-2]. \quad (17)$$

On the other hand, in the frame shown in FIG. 16, the readout start position at the upper left is given by $$(0,0)=[2,2]. \quad (18)$$

The readout end position is given by $$(m,n)=[k,l]. \quad (19)$$

The image area selection processing unit 254 selects an area common to the frame shown in FIG. 15 and that shown in FIG. 16. That is, for the frame shown in FIG. 15, the image area selection processing unit 254 selects a rectangular area having (2, 2) and (m, n) as the diagonal apices. For the frame shown in FIG. 16, the image area selection processing unit 254 selects a rectangular area having (0, 0) to (m−2, n−2) as the diagonal apices. The area selected by the image area selection processing unit 254 always has (m−2)×(n−2) pixel data.

When the region to be cropped in advance is taken into consideration, the total number of images to be read out from the photoelectric conversion element 222 must take the output image size and phase shift amount into consideration. The image area selection processing unit 254 changes the crop area on the basis of the information of the readout start position.

The frame memories 272 and 274 are first in first out (FIFO) memories. The interframe arithmetic processing unit 282 generates an output image by using pixels at the same position in the frame memories 272 and 274.

For, e.g., two frames, a synthetic image out(i, j) is given by $$out(i,j)=0.5I(k,i,j)+0.5I(k-1,i,j), \quad (20)$$

where i, j is the pixel position, and I(k, i, j) is the intensity of the image signal at the pixel position i, j of the kth frame.

For three frames, the synthetic image out(i, j) is given by $$out(i,j)=0.25I(k,i,j)+0.5I(k-1,i,j)+0.25I(k-2,i,j) \quad (21)$$

by using weighted distribution. By executing interframe interpolation, an effect of increasing the image quality by low-pass operation is obtained in addition to the distortion correction effect.

In this embodiment, thinning readout is executed in both the horizontal and vertical directions, and linear distortion correction is executed by pipeline processing in both the horizontal and vertical directions. For a CCD, an image sensing element that executes an operation of vertical transfer→horizontal transfer cannot read out image data thinning out it in the horizontal direction in principle. For this reason, in the horizontal direction, all pixels must be read out, and a size change by linear interpolation must be executed, as in Equation (1).

In the image sensing apparatus 200 of this embodiment, due to the same reason as in the first embodiment, for an image scaling ratio of 100% or more, size change is executed by vertical interlaced readout+linear interpolation processing interpolation. For a relatively high reduction magnification, e.g., a scaling ratio of approximately 70% to 100%, size change is executed by thinning readout+distortion correction processing. For a relatively low reduction magnification, e.g., a scaling ratio lower than 70%, size change is executed by horizontal averaging vertical interlaced readout+linear interpolation processing. As in the first embodiment, the scaling ratio to switch the readout mode may be adjusted in accordance with the object.

As a result, in the image sensing apparatus of this embodiment, by switching between the readout scheme and subsequent image signal processing in accordance with the image scaling ratio, a high-resolution image can be obtained in a wide scaling ratio range. In addition, when the scaling ratio is lower than 100%, the scaling ratio can be designated at a fine interval.

Third Embodiment

This embodiment is particularly directed to an image sensing apparatus that is suitably used to sense a moving image.

Figure 17:
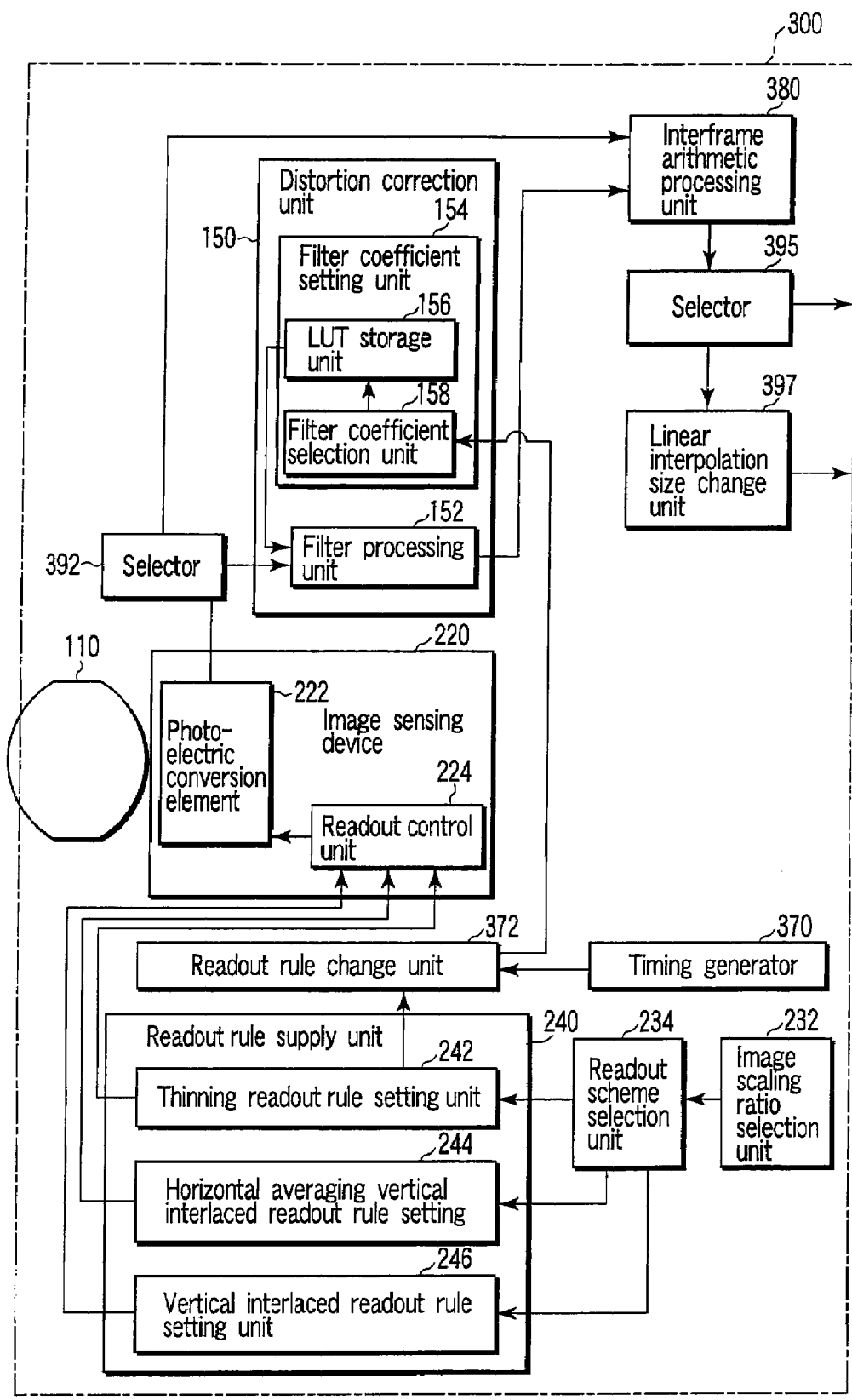
FIG. 17 shows the arrangement of an image sensing apparatus according to the third embodiment of the present invention.

FIG. 17 shows the arrangement of an image sensing apparatus according to the third embodiment of the present invention. The same reference numerals as in the image sensing apparatus 100 of the first embodiment denote the same elements in FIG. 17, and a detailed description thereof will be omitted to avoid any repetitive description.

An image sensing apparatus 300 of this embodiment has an imaging optical system 110 that forms an optical image of an object and an image sensing device 220 that continuously outputs an image signal in a predetermined region of the optical image formed by the imaging optical system 110. That is, the image signal output from the image sensing device 220 is a moving image signal, which comprises image data of a plurality of frames that time-serially continue.

The image sensing device 220 has a two-dimensional photoelectric conversion element 222 that photoelectrically converts the optical image formed by the imaging optical system 110 to acquire image data (pixel data set) and a readout control unit 224 that continuously reads out the image data acquired by the photoelectric conversion element 222 in accordance with a supplied readout rule.

The image sensing apparatus 300 also has an image scaling ratio selection unit 132 that selects the scaling ratio of the image to be output, a readout scheme selection unit 234 that selects, in accordance with the selected image scaling ratio, a readout scheme of the image data to be read out from the photoelectric conversion element 222 by the readout control unit 224, and a readout rule supply unit 240 that supplies, to the image sensing device 220, a readout rule corresponding to the readout scheme selected by the readout scheme selection unit 234.

The readout scheme selection unit 234 selects one of a thinning readout mode, a horizontal averaging vertical interlaced readout mode, and a vertical interlaced readout mode in accordance with the selected image scaling ratio. The readout rule supply unit 240 includes a thinning readout rule setting unit 242 that sets a readout rule corresponding to the thinning readout mode, a horizontal averaging vertical interlaced readout rule setting unit 244 that sets a readout rule corresponding to the horizontal averaging vertical interlaced readout mode, and a vertical interlaced readout rule setting unit 246 that sets a readout rule corresponding to the vertical interlaced readout mode.

More specifically, for an image scaling ratio lower than 100%, i.e., image reduction, the readout scheme selection unit 234 selects one of the thinning readout mode and horizontal averaging vertical interlaced readout mode. For an image scaling ratio of 100% or more, i.e., image enlargement, the readout scheme selection unit 234 selects the vertical interlaced readout mode.

For an image scaling ratio lower than 100%, the readout scheme selection unit 234 selects one of the thinning readout mode and horizontal averaging vertical interlaced readout mode on the basis of the image scaling ratio and an important one of image quality factors such as contrast, resolution, distortion, luminance moiré, and color moiré of the image to be output.

The image sensing apparatus 300 also has a timing generator 370 that generates a frame timing and a readout rule change unit 372 that changes the readout rule between frames in synchronism with the frame timing from the timing generator 370. When the thinning readout mode is selected, the readout rule change unit 372 changes the thinning readout rule for each frame. Simultaneously, the readout rule change unit 372 generates an instruction to select a coefficient used for a distortion correction filter in accordance with the readout rule. Details of a distortion correction unit 150 are the same as described in the first embodiment.

In the readout rule that is changed for each frame by the readout rule change unit 372, when the selected scaling ratio is constant, the number of pixels to be read out does not change, although the reference position of the readout area and array pattern change.

The readout control unit 224 in the image sensing device 220 continuously reads out image data (pixel data of one frame) in a corresponding area in the pixel matrix in the photoelectric conversion element 222 on the basis of the readout rule set by the thinning readout rule setting unit 242 and the reference position of the readout area set by the readout rule change unit 372. As a result, the image sensing device 220 outputs a moving image signal comprising image data of a plurality of frames that time-serially continue.

The image sensing apparatus 300 also has an interframe arithmetic processing unit 380 that generates new image data by using image data of a plurality of frames. In the horizontal averaging vertical interlaced readout mode and vertical interlaced readout mode, the interframe arithmetic processing unit 380 executes interframe interpolation arithmetic processing. In the thinning readout mode, the interframe arithmetic processing unit 380 executes interframe weighted addition represented by Equation (20) or (21) described above.

The image sensing apparatus 300 also has a selector 392 that selectively sends the image signal output from the image sensing device 220 to one of the distortion correction unit 150 and interframe arithmetic processing unit 380 in accordance with the readout scheme selected by the readout scheme selection unit 234.

When the readout scheme selection unit 234 selects the thinning readout mode, the selector 392 sends the image signal from the image sensing device 220 to the interframe arithmetic processing unit 380 through the distortion correction unit 10.

When the readout scheme selection unit 234 selects the horizontal averaging vertical interlaced readout mode or vertical interlaced readout mode, the selector 392 sends the image signal from the image sensing device 220 to the interframe arithmetic processing unit 380.

The interframe arithmetic processing unit 380 is connected to a linear interpolation size change unit 397 through a selector 395. When the readout scheme selection unit 234 selects the horizontal averaging vertical interlaced readout mode or vertical interlaced readout mode, and size change is necessary, the selector 395 transmits the output data from the interframe arithmetic processing unit 380 to the linear interpolation size change unit 397, so that an image with a predetermined size is obtained by linear interpolation processing in the frame.

When the readout scheme selection unit 234 selects the thinning readout mode, and the image size obtained by the distortion correction unit 150 is to be used as the final size, the output from the interframe arithmetic processing unit 380 is directly used. Hence, the selector 395 bypasses the linear interpolation size change unit 397. To obtain an image size different from that obtained by size change by the thinning readout, the selector 395 transmits the output data from the interframe arithmetic processing unit 380 to the linear interpolation size change unit 397, so that an image with a predetermined size is obtained by linear interpolation processing in the frame.

As is apparent from the above description, in the image sensing apparatus according to this embodiment, a high-resolution image can be obtained in a wide scaling ratio range by switching the readout scheme and subsequent image signal processing in accordance with the image scaling ratio. In addition, at a scaling ratio lower than 100%, the scaling ratio can be designated at a fine interval. Furthermore, in the thinning readout mode, image information in a wide region is obtained within the same time as in full scanning.

The embodiments of the present invention have been described above with reference to the accompanying drawings. However, the present invention is not limited to these embodiments, and various changes and modifications may be made without departing from the spirit and scope of the present invention.

What is claimed is:

1. An image sensing apparatus that outputs an image of an object, comprising:
   an image sensing device including a photoelectric conversion element that photoelectrically converts an optical image to acquire image data, and a readout control unit that reads out, in accordance with a supplied readout rule, the image data acquired by the photoelectric conversion element;
   an image scaling ratio selection unit that selects a scaling ratio of the image to be output;

a readout scheme selection unit that selects, in accordance with the selected image scaling ratio, a readout scheme of the image data to be read out from the photoelectric conversion element by the readout control unit; and a readout rule supply unit that supplies, to the readout control unit, a readout rule corresponding to the readout scheme selected by the readout scheme selection unit; and wherein the readout scheme includes a thinning readout mode, an averaging readout mode, and a full pixel readout mode, the readout scheme selection unit selects one readout scheme of the thinning readout mode, averaging readout mode, and full-pixel readout mode in accordance with the selected image scaling ratio, and the readout rule supply unit includes a thinning readout rule setting unit that sets a readout rule corresponding to the thinning readout mode, an averaging readout rule setting unit that sets a readout rule corresponding to the averaging readout mode, and a full-pixel readout rule setting unit that sets a readout rule corresponding to the full-pixel readout mode.

2. An image sensing apparatus according to claim 1, further comprising a distortion correction unit that executes distortion correction for the image signal output from the image sensing device in the thinning readout mode, a linear interpolation size change unit that executes size change by linear interpolation for the image signal output from the image sensing device in the averaging readout mode and full-pixel readout mode, and a selector that selectively sends the image signal output from the image sensing device to one of the distortion correction unit and the linear interpolation size change unit in accordance with the readout scheme selected by the readout scheme selection unit.

* * * * *